(12) United States Patent
Yusa et al.

(10) Patent No.: US 11,362,388 B2
(45) Date of Patent: Jun. 14, 2022

(54) BATTERY PACK AND ELECTRIC DEVICE

(71) Applicant: Murata Manufacturing Co., Ltd., Kyoto-fu (JP)

(72) Inventors: Hiroshi Yusa, Fukushima (JP); Hideo Uryu, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 479 days.

(21) Appl. No.: 15/519,223

(22) PCT Filed: Nov. 13, 2015

(86) PCT No.: PCT/JP2015/005680
§ 371 (c)(1),
(2) Date: Apr. 14, 2017

(87) PCT Pub. No.: WO2016/088305
PCT Pub. Date: Jun. 9, 2016

(65) Prior Publication Data
US 2017/0244073 A1    Aug. 24, 2017

(30) Foreign Application Priority Data

Dec. 4, 2014 (JP) .............................. JP2014-246133

(51) Int. Cl.
*H01M 50/20* (2021.01)
*H01M 50/502* (2021.01)

(52) U.S. Cl.
CPC ......... *H01M 50/20* (2021.01); *H01M 50/502* (2021.01); *H01M 2220/20* (2013.01)

(58) Field of Classification Search
CPC ...... H01M 2/10; H01M 2/1077; H01M 2/206; H01M 2/202; H01M 2/1016; H01M 2/1066; H01M 2/1011; H01M 2/1022; H01M 10/4257; H01M 2/204; H01M 50/20; H01M 50/502; H01M 50/503; H01M 50/507; H01M 50/509; H01M 50/51;
(Continued)

(56) References Cited

U.S. PATENT DOCUMENTS

| 5,709,964 A | 1/1998 | Christensen et al. |
| 5,853,915 A | 12/1998 | Suto |

(Continued)

FOREIGN PATENT DOCUMENTS

| BE | 582887 | 3/1960 |
| CN | 203589117 | 5/2014 |

(Continued)

OTHER PUBLICATIONS

English Translation of EP-2469622-A1.*
(Continued)

*Primary Examiner* — Kiran Akhtar
(74) *Attorney, Agent, or Firm* — K&L Gates LLP

(57) ABSTRACT

A battery pack is provided with a plurality of battery blocks each including a peripheral surface on one end of which a first connector is provided, a connecting unit which connects a plurality of battery blocks to each other such that two first connectors are opposed to each other, and a second connector which fits in the two first connectors opposed to each other. The battery block is rotationally fixed to the connecting unit.

5 Claims, 15 Drawing Sheets

(58) Field of Classification Search
CPC ............. H01M 50/412; H01M 50/514; H01M 50/517; H01M 50/528; H01M 50/229; H01M 50/531–538; H01M 50/529; H01M 2220/30; Y02E 60/10; Y02T 10/70
See application file for complete search history.

(56) References Cited

U.S. PATENT DOCUMENTS

| 2004/0100776 | A1 | | 5/2004 | Haas et al. |
| 2010/0085020 | A1 | * | 4/2010 | Suzuki ................... B25F 5/00 320/157 |
| 2011/0049982 | A1 | * | 3/2011 | Allen .................... H02J 7/0063 307/29 |

FOREIGN PATENT DOCUMENTS

| DE | 298 24 609 | | 5/1998 | |
| EP | 2 343 752 | | 7/2011 | |
| EP | 2343752 | * | 7/2011 | ............. H01M 2/10 |
| EP | 2 469 622 | | 6/2012 | |
| EP | 2469622 | A1 * | 6/2012 | .......... H01M 2/1005 |
| EP | 2 639 852 | | 9/2013 | |
| EP | 2 811 364 | | 12/2014 | |
| JP | 2004-152507 | A | 5/2004 | |
| JP | 2004-178585 | A | 6/2004 | |
| JP | 2005-317458 | | 10/2005 | |
| JP | 2011-134540 | * | 7/2011 | ............. H01M 2/10 |
| JP | 2011-134540 | A | 7/2011 | |
| JP | 2011-216366 | * | 10/2011 | ............. H01M 2/10 |
| JP | 2011-216366 | A | 10/2011 | |
| JP | 2013-041774 | A | 2/2013 | |
| KR | 10-2011-0122055 | | 11/2011 | |

OTHER PUBLICATIONS

English Translation of JP2011-134540.*
English Translation of JP2011-216366.*
International Search Report (with English translation) dated Jan. 12, 2016 in corresponding international application No. PCT/JP2015/005680 (5 pages).
Written Opinion dated Jan. 12, 2016 in corresponding international application No. PCT/JP2015/005680 (3 pages).
European Search Report dated Jun. 28, 2018 in corresponding European Application No. 15864403.9.
Chinese Office Action for Chinese patent Application No. 201580057242.4, dated May 14, 2019; (7 pages).
Korean Office Action dated Sep. 24, 2019 in corresponding Korean Application No. 10-2017-7010271.

* cited by examiner

FIG. 3
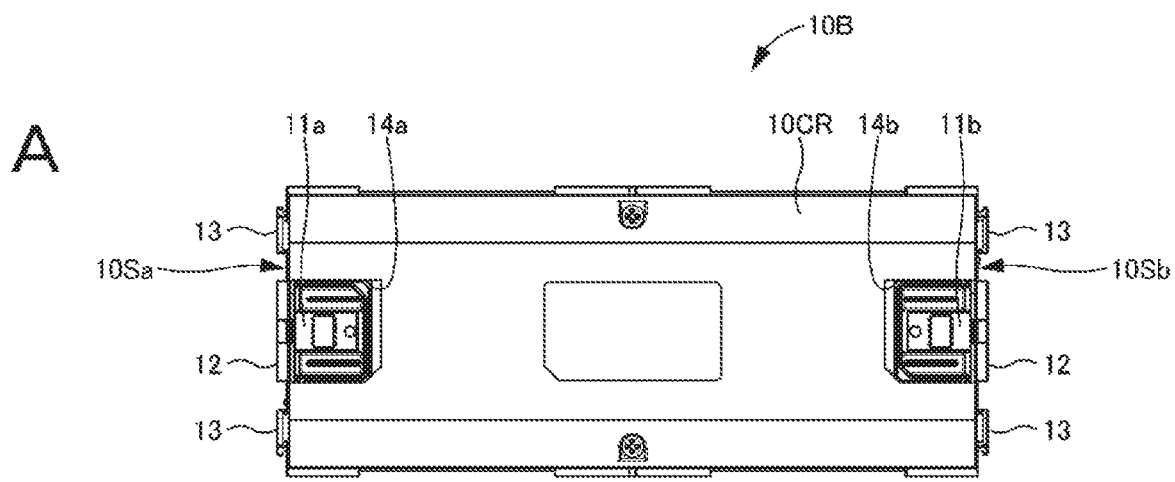
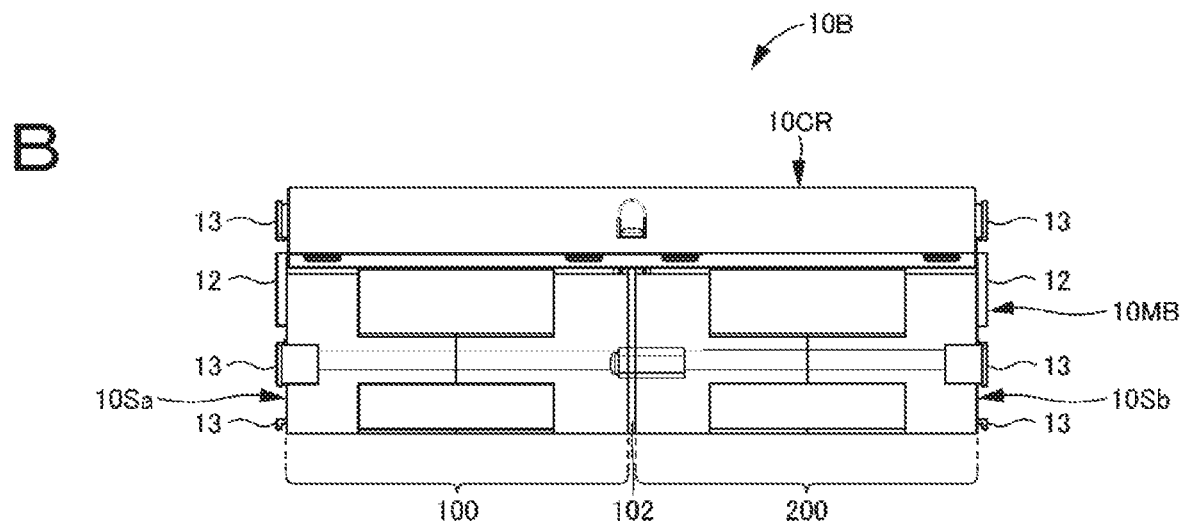

FIG. 6
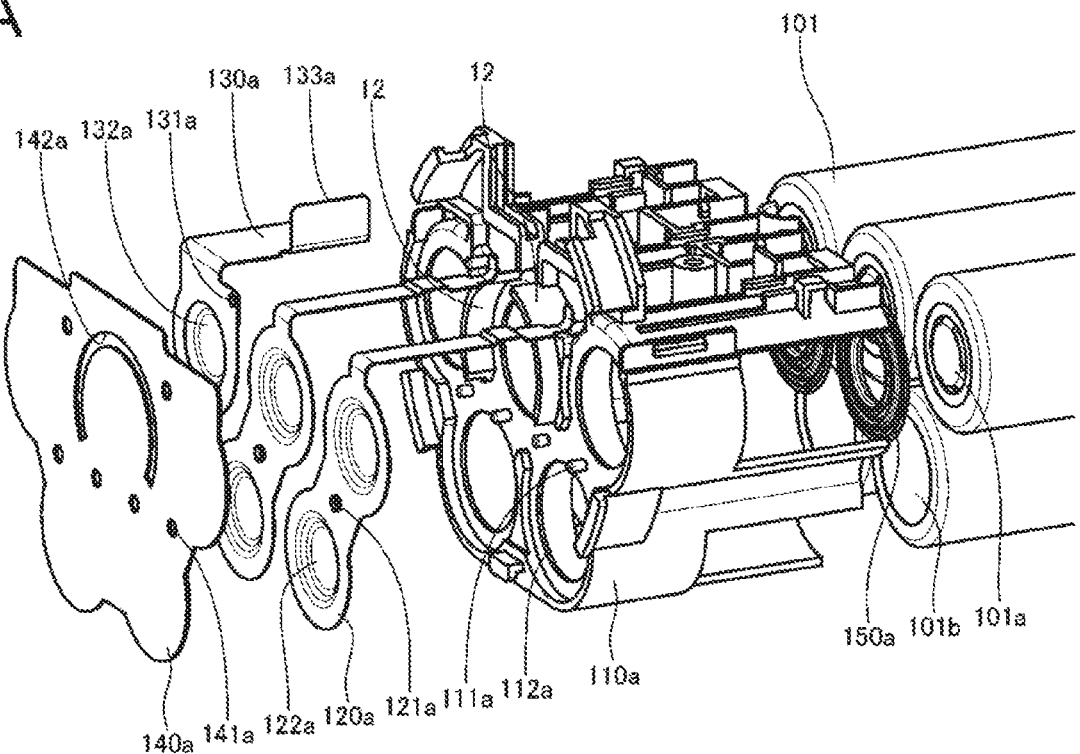
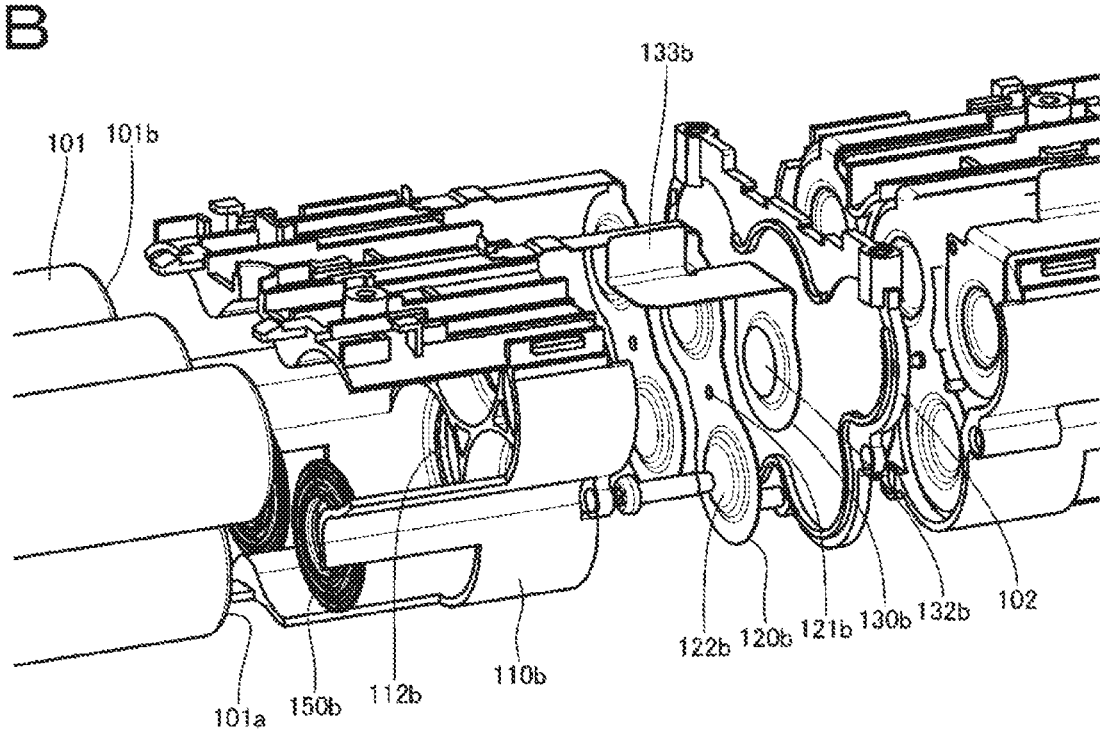

FIG. 7
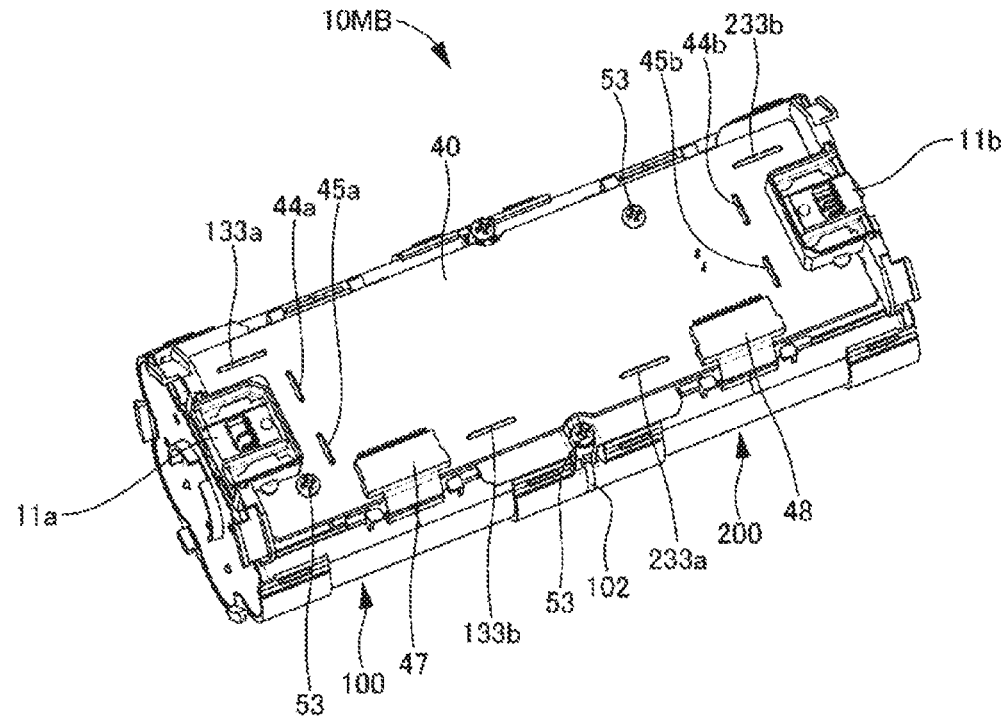
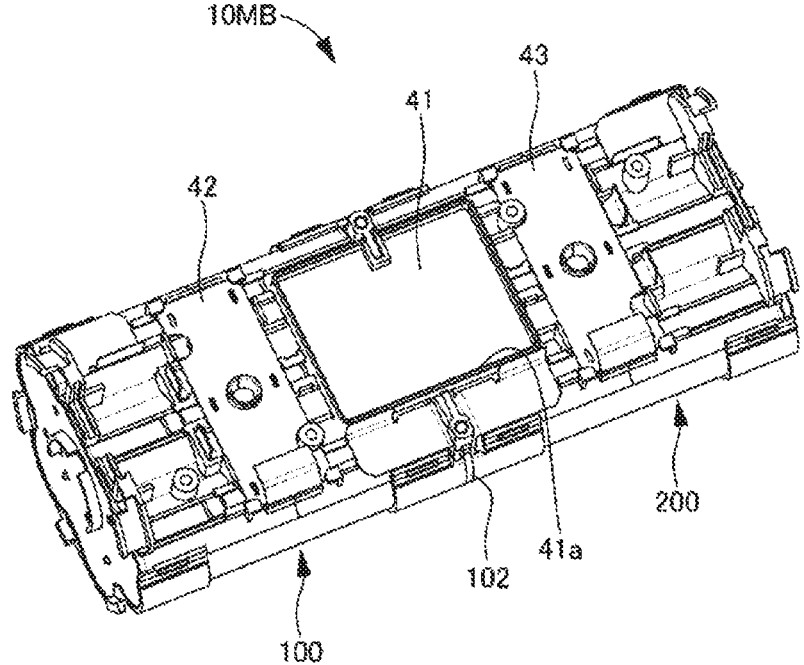

FIG. 8
A
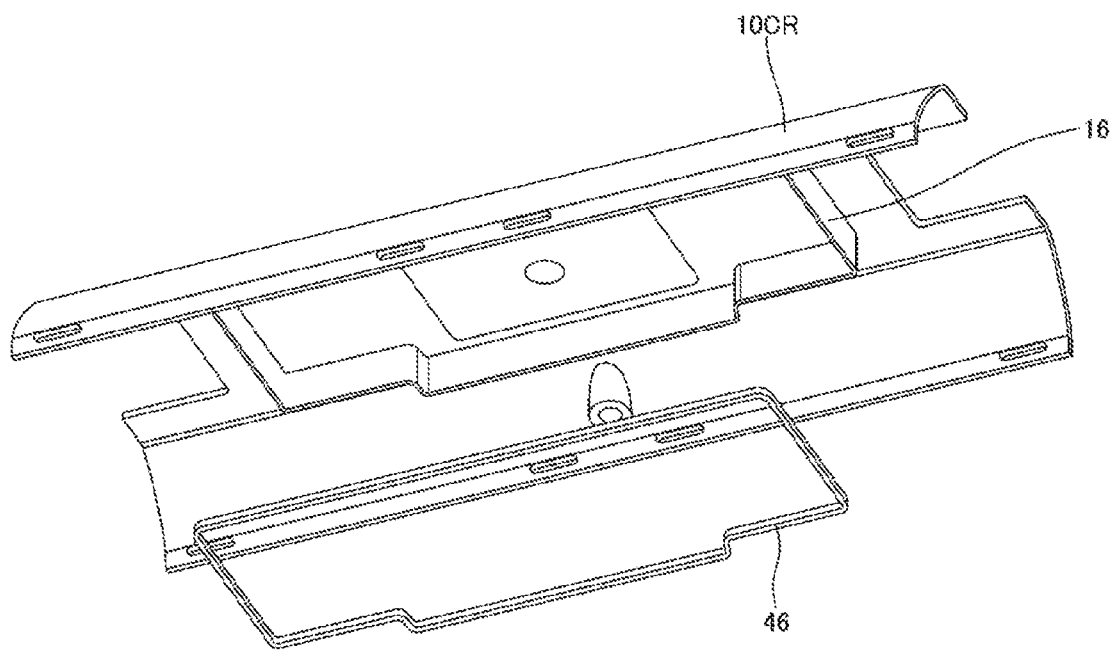
B
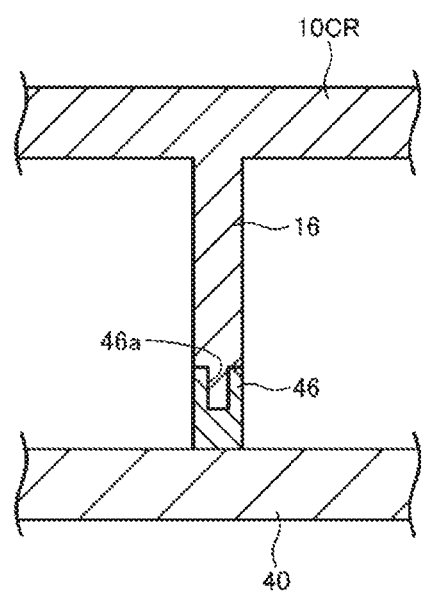

FIG. 9
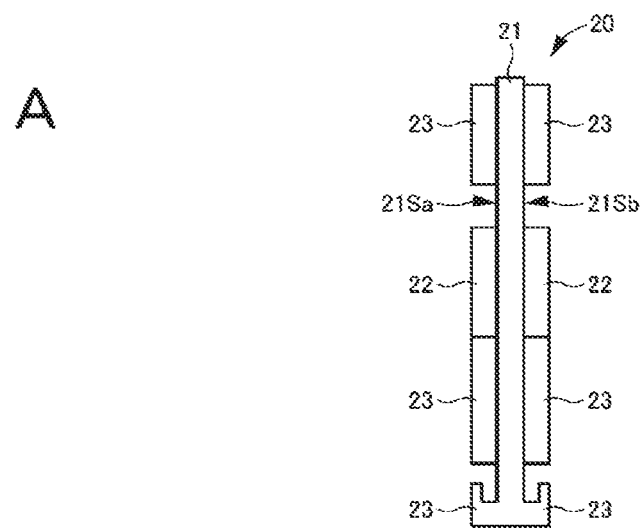
A
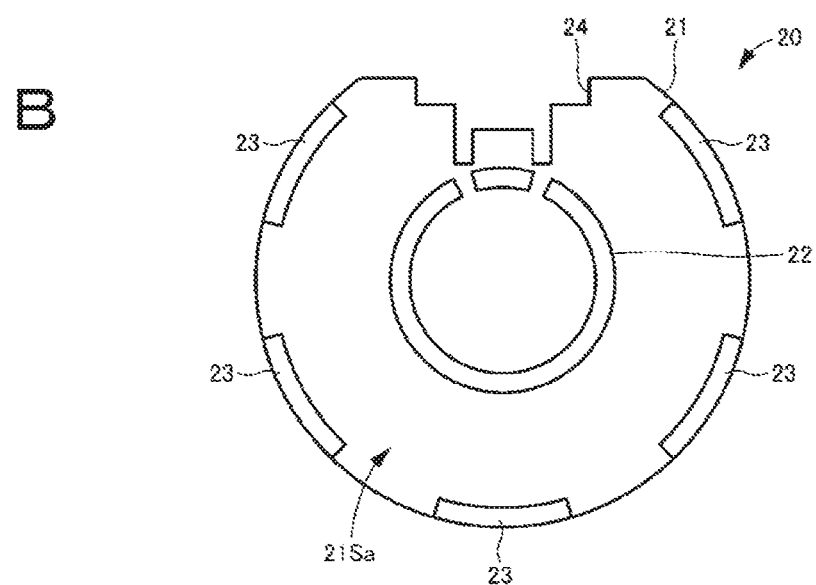
B
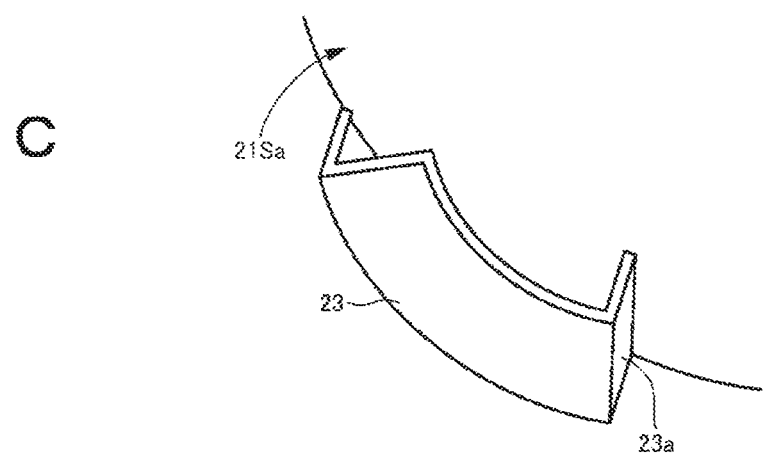
C

FIG. 10
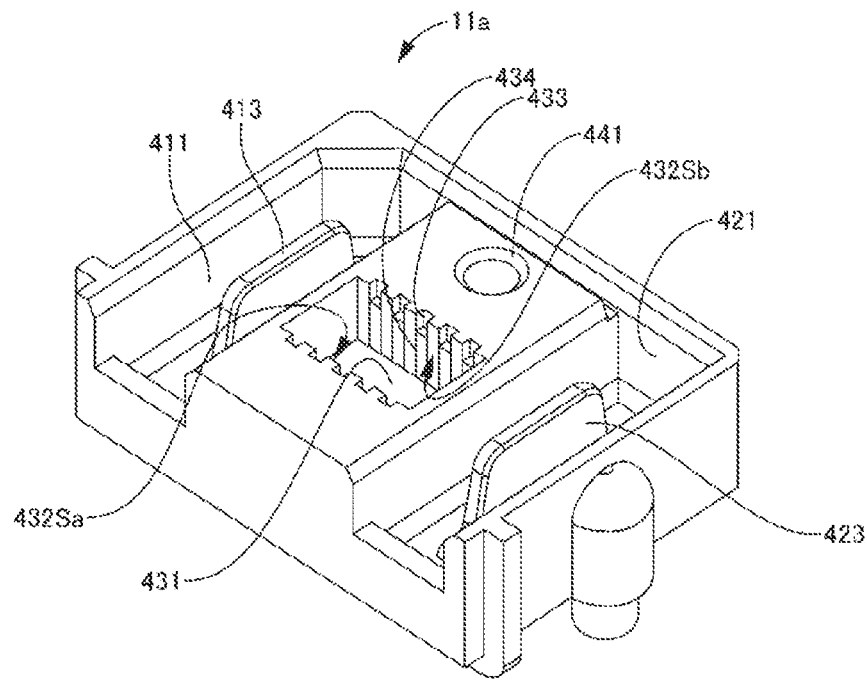
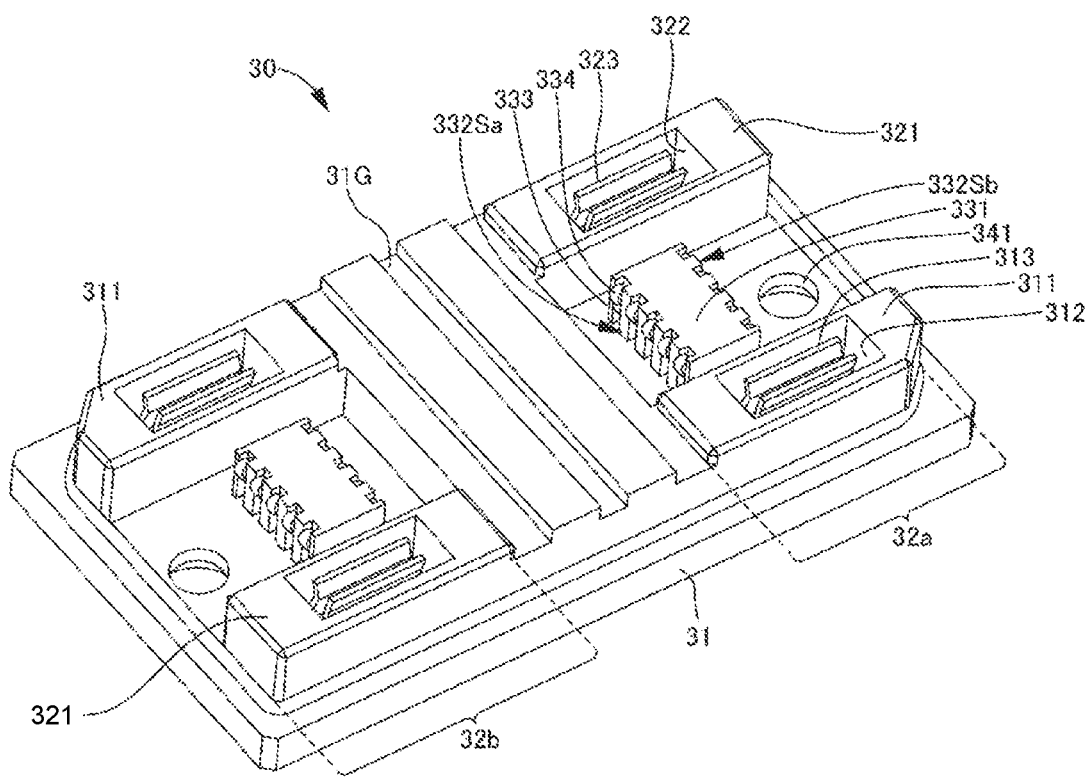

FIG. 11
A
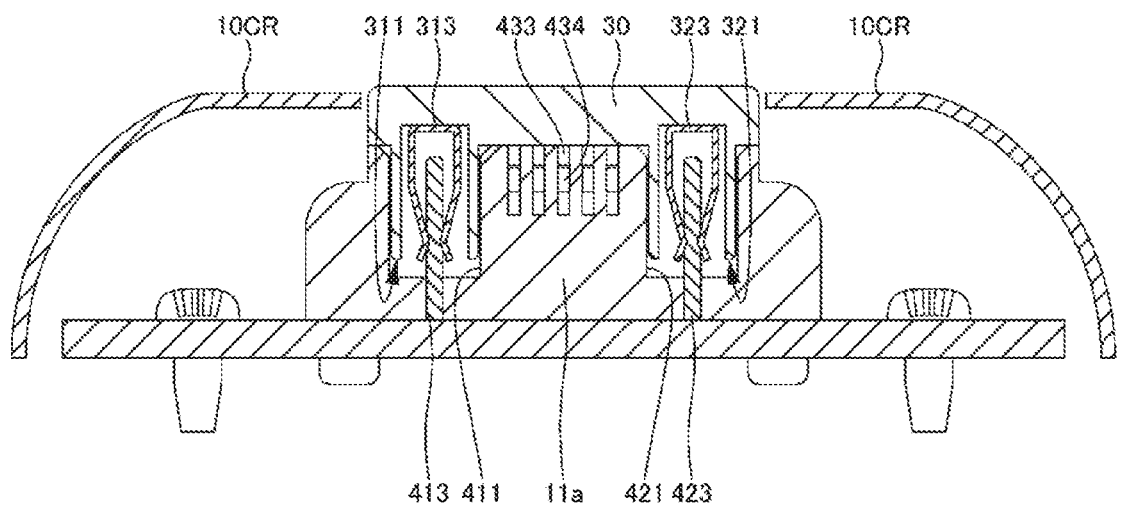
B
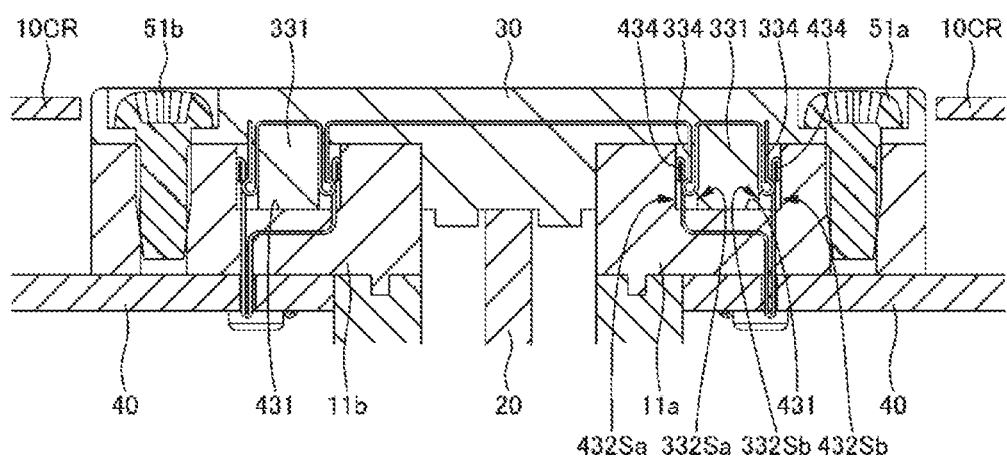

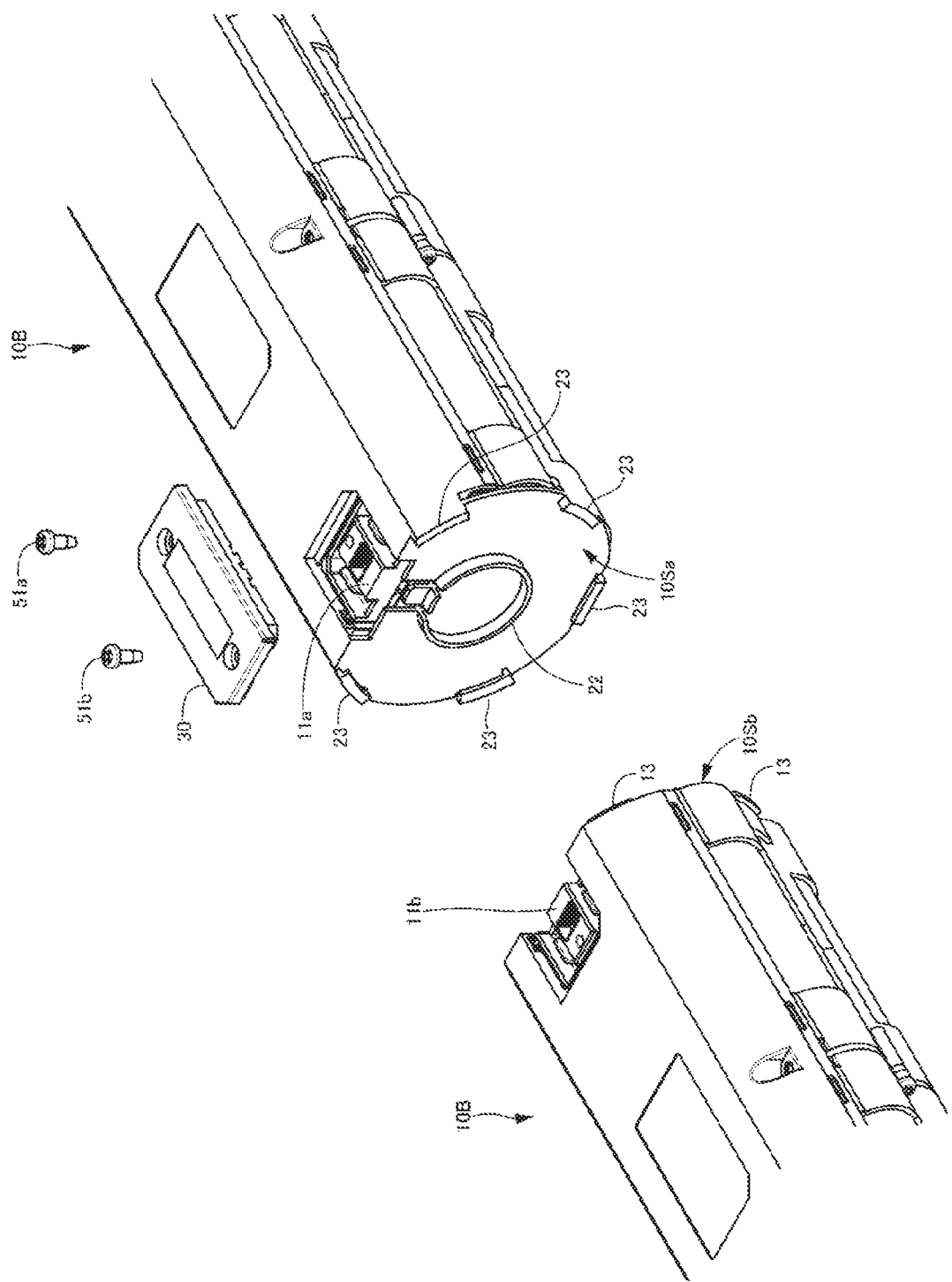

BATTERY PACK AND ELECTRIC DEVICE

CROSS-REFERENCE TO RELATED APPLICATIONS

The present application claims the benefit of International Application No. PCT/JP2015/005680, filed Nov. 13, 2015, which claims priority to Japanese Application No. 2014-246133, filed Dec. 4, 2014, the disclosures of which are incorporated herein by reference.

BACKGROUND

The present technology relates to a battery pack and an electric device provided with the same. In detail, this relates to the battery pack provided with a plurality of battery blocks and the electric device provided with the same.

A battery block in which a plurality of secondary batteries is connected to each other in series and/or in parallel is used as a power source for a power tool such as an electric tool, a power-assisted bicycle, and an electric motorcycle. Technology of connecting the battery block to a device main body and technology of connecting a plurality of battery blocks to each other are studied.

For example, Patent Document 1 discloses an electric device in which a power source block (battery block) is mounted on a device main body through locking means. In this electric device, an operating unit is provided on the power source block in order to disengage the locking means and an operational direction of the operating unit is set to a direction around an axis with respect to a direction in which the power source block is attached to/detached from the device main body.

CITATION LIST

Patent Document

Patent Document 1: Japanese Patent Application Laid-Open No. 2004-152507

SUMMARY

Problems to be Solved by the Invention

An object of the present technology is to provide a battery pack capable of easily connecting a plurality of battery blocks to each other and an electric device provided with the same.

Solutions to Problems

In order to solve the above-described problem, first technology is a battery pack provided with
a plurality of battery blocks each including a peripheral surface on one end or both ends of which a first connector is provided,
a connecting unit which connects the plurality of battery blocks to each other such that two first connectors are opposed to each other, and
a second connector which fits in the two first connectors opposed to each other, wherein
a battery block is rotationally fixed to the connecting unit.
Second technology is an electric device provided with
a battery pack, and
an electric device main body supplied with electric power from the battery pack, wherein
the battery pack is provided with
a plurality of battery blocks each including a peripheral surface on one end or both ends of which a first connector is provided,
a connecting unit which connects the plurality of battery blocks to each other such that two first connectors are opposed to each other, and
a second connector which fits in the two first connectors opposed to each other, and
a battery block is rotationally fixed to the connecting unit.
In the first and second technologies, the connecting unit may be formed integral with the battery block or formed separately from the battery block.
Third technology is a battery pack provided with
a plurality of battery blocks each including a peripheral surface on one end or both ends of which a first connector is provided, and
a second connector which fits in two first connectors opposed to each other between ends of the battery blocks, wherein
the ends of the battery blocks are rotationally fixed to each other.
Fourth technology is an electric device provided with
a battery pack, and
an electric device main body supplied with electric power from the battery pack, wherein
the battery pack is provided with a plurality of battery blocks each including a peripheral surface on one end or both ends of which a first connector is provided, and
a second connector which fits in two first connectors opposed to each other between ends of the battery blocks, and
the ends of the battery blocks are rotationally fixed to each other.

Effects of the Invention

As described above, according to the present technology, a battery pack capable of easily connecting a plurality of battery blocks to each other may be realized.

BRIEF DESCRIPTION OF DRAWINGS

FIG. 3A is an upper view illustrating an example of the appearance of the battery block. FIG. 3B is a side view illustrating an example of the appearance of the battery block.

FIG. 6A is an exploded perspective view illustrating an example of a configuration on a first end face side of a sub block. FIG. 6B is an exploded perspective view illustrating an example of a configuration on a second end face side of the sub block.

FIG. 7A is a perspective view illustrating an example of the appearance of the battery block in a state without a cover.

FIG. 7B is a perspective view illustrating an example of the appearance of the battery block in a state without the cover and a printed-wiring substrate.

FIG. 8A is an exploded perspective view illustrating an example of a configuration of a cover rear surface. FIG. 8B is an enlarged cross-sectional view illustrating an example of the configuration of the cover rear surface.

FIG. 9A is a side view illustrating an example of a configuration of a connecting spacer. FIG. 9B is a front view illustrating an example of the configuration of the connecting spacer. FIG. 9C is a perspective view illustrating an example of a click shape.

FIG. 10A is a perspective view illustrating an example of a configuration of a connector. FIG. 10B is a perspective view illustrating an example of a configuration of a relay connector.

FIG. 11A is a cross-sectional view illustrating an example of a configuration of an end of the battery block. FIG. 11B is a cross-sectional view illustrating an example of a configuration of a connecting unit between two battery blocks.

FIG. 15 is an exploded perspective view illustrating an example of a configuration of a battery pack according to a variation of the first embodiment of the present technology.

DETAILED DESCRIPTION

Embodiments of the present technology are described in the following order with reference to the drawings. Meanwhile, the same or corresponding portions are assigned with the same reference signal throughout all the drawings of the following embodiments.

1 First Embodiment (Example of Battery Pack)
1.1 Configuration of Battery Pack
1.2 Method of Connecting Battery Packs
1.3 Effect
2 Second Embodiment (Example of Electric Device)

1 First Embodiment

[1.1 Configuration of Battery Pack]
(Schematic Configuration)

Figure 1:
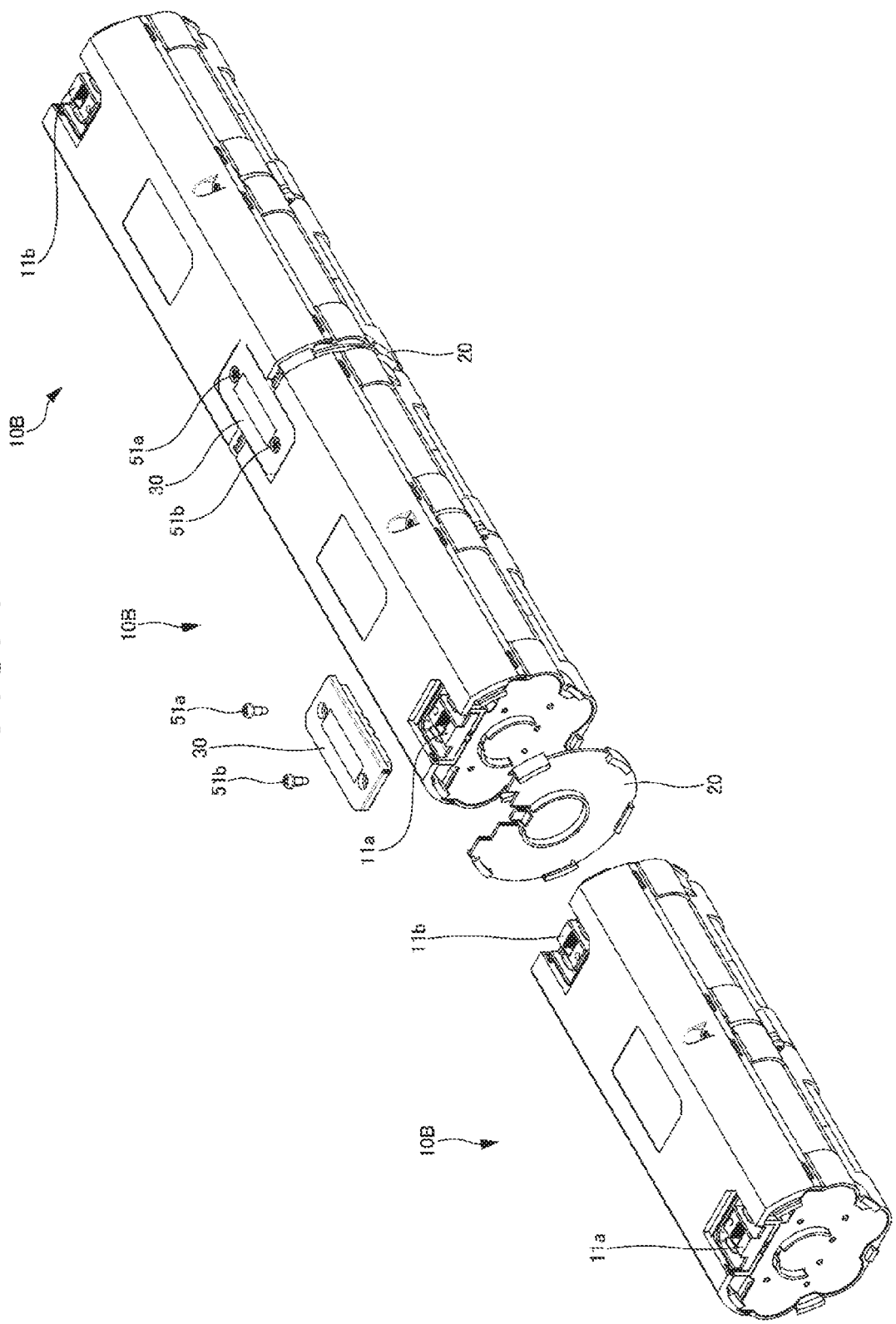
FIG. 1 is an exploded perspective view illustrating an example of a configuration of a battery pack according to a first embodiment of the present technology.
Figure 2:
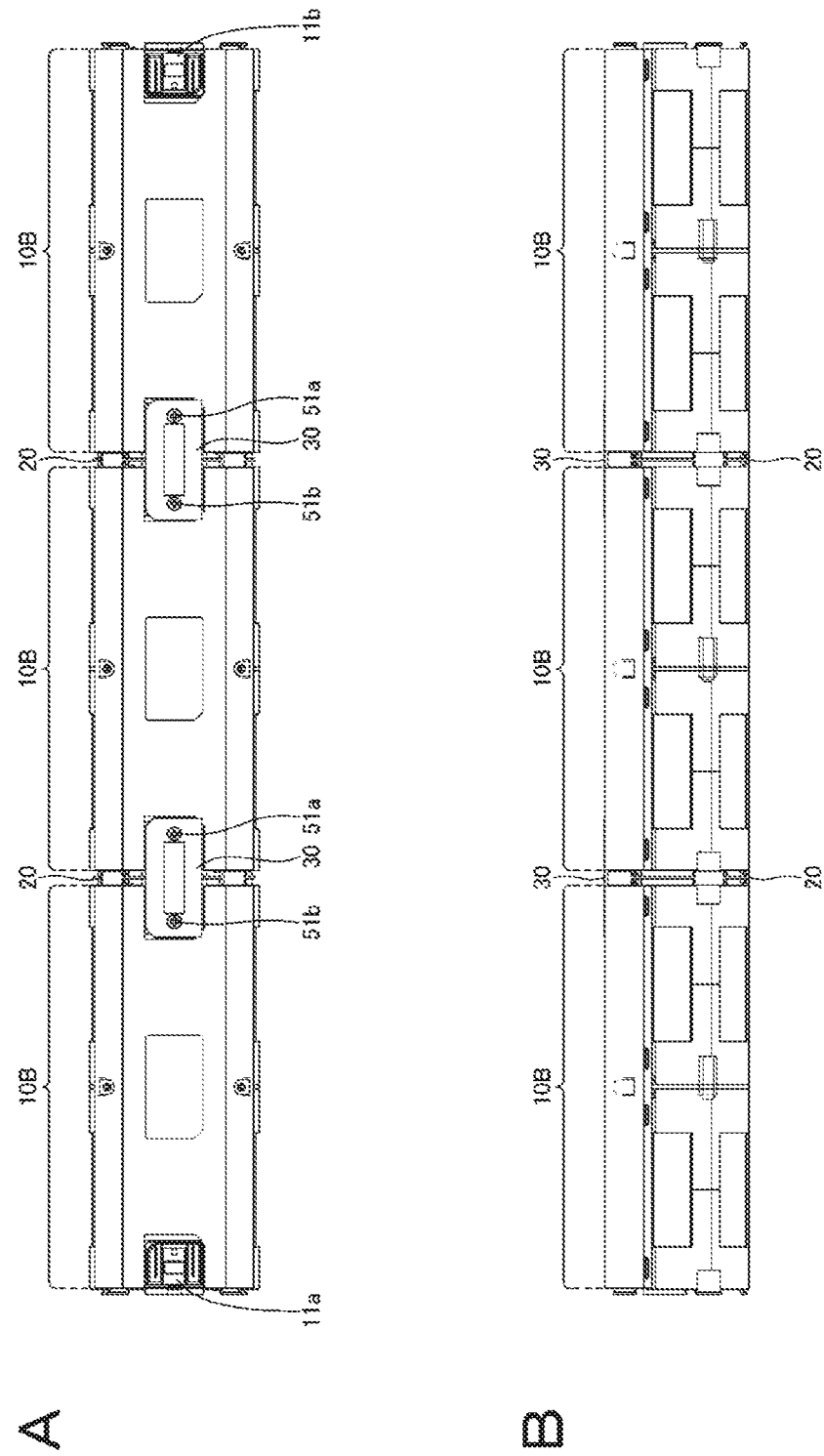
FIG. 2A is an upper view illustrating an example of an appearance of the battery pack.
FIG. 2B is a side view illustrating an example of an appearance of a battery pack.

First, an example of a schematic configuration of a battery pack according to a first embodiment of the present technology is described with reference to FIGS. 1, 2A, and 2B. The battery pack has a substantially cylindrical shape. The battery pack is provided with a plurality of battery blocks 10B, one or a plurality of connecting spacers (connecting members) 20, and one or a plurality of relay connectors (second connectors) 30.

The battery block 10B includes a peripheral surface on which connectors (first connectors) 11a and 11b are provided. The connector 11a is provided on one end of the peripheral surface of the battery block 10B and the connector 11b is provided on the other end of the peripheral surface of the battery block 10B. A plurality of battery blocks 10B is connected to each other such that end faces of adjacent battery blocks 10B oppose each other.

The connecting spacer 20 is provided between the end faces of two adjacent battery blocks 10B and the two adjacent battery blocks 10B are connected to each other through the connecting spacer 20. The connecting spacer 20 connects the two battery blocks 10B to each other such that the two connectors 11a and 11b oppose to each other in a connecting portion. The battery block 10B is rotationally fixed to the connecting spacer 20.

The relay connector 30 is provided so as to stride across the connecting portion of the two battery blocks 10B. The relay connector 30 fits in the two opposed connectors 11a and 11b in a state in which a plurality of battery blocks 10B is connected to each other by the connecting spacer 20. One end of the relay connector 30 is fixed to the connector 11a by means of a screw 51a and the other end of the relay connector 30 is fixed to the connector 11b by means of a screw 51b. By fixing the relay connector 30 by means of the screws 51a and 51b in this manner, resistance to shock of the battery pack is improved.

Next, the battery block 10B, the connecting spacer 20, and the relay connector 30 forming the battery pack are sequentially described.

(Battery Block)

The battery block 10B has a substantially cylindrical shape. As illustrated in FIGS. 3A and 3B, the battery block 10B includes substantially circular end faces 10Sa and 10Sb on both ends thereof. The end face 10Sb has a configuration similar to that of the end face 10Sa, so that the configuration of the end face 10Sb is not hereinafter described.

Figure 4:
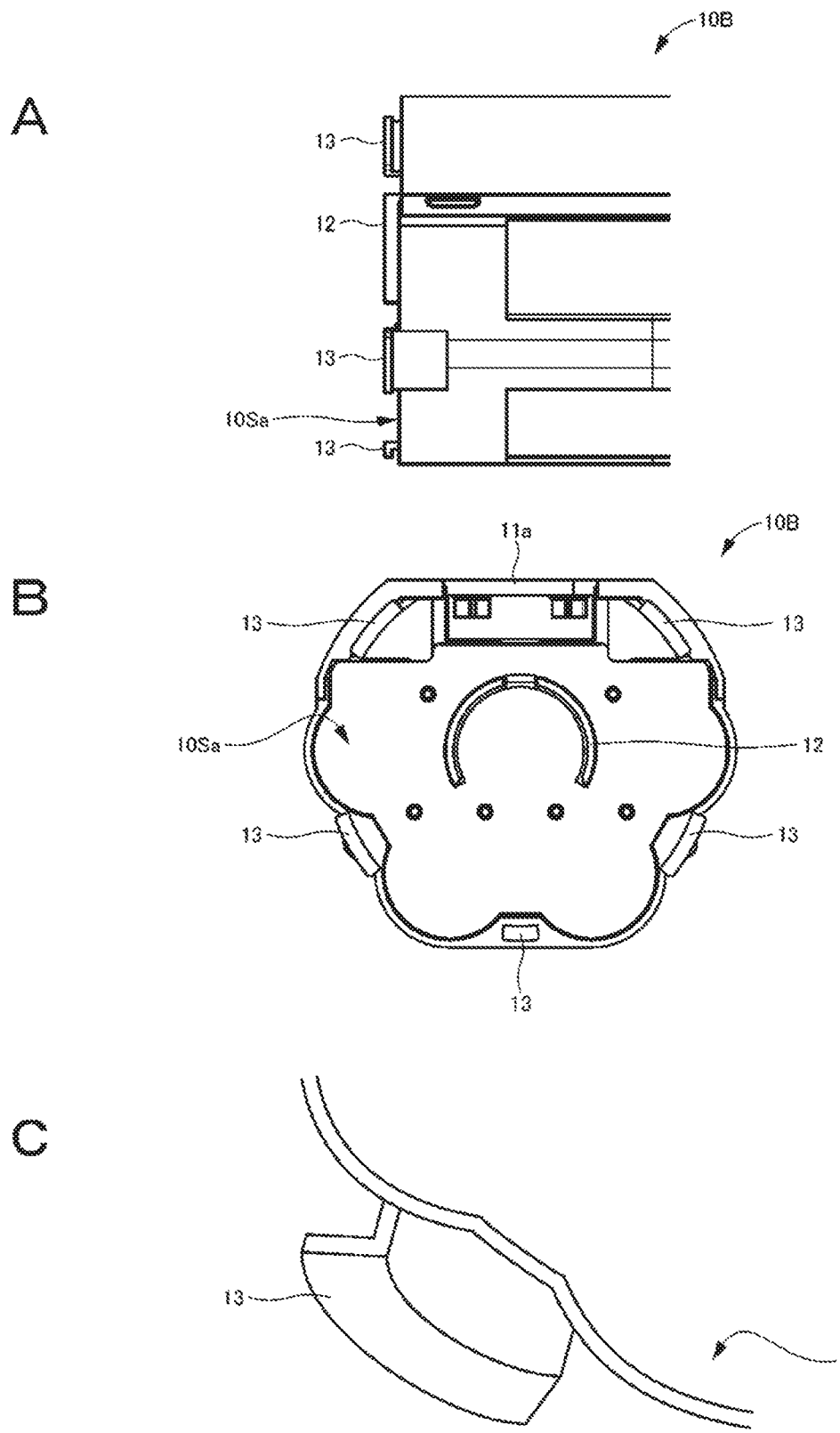
FIG. 4A is a side view illustrating an example of a configuration of an end face of the battery block.
FIG. 4B is a front view illustrating an example of the configuration of the end face of the battery block.
FIG. 4C is a perspective view illustrating an example of a click shape.

As illustrated in FIGS. 4A and 4B, a convex portion 12 and a plurality of clicks (first clicks) 13 are provided on the end face 10Sa. Meanwhile, an example in which five clicks 13 are provided is illustrated in FIGS. 4A and 4B. The convex portion 12 is a positioning unit for positioning the battery block 10B with respect to a principal surface of the connecting spacer 20. Center axes of the connecting spacer 20 and the battery block 10B coincide with each other by this positioning. The convex portion 12 has a circular ring shape or a partially circular ring shape, for example. The center of the circular ring shape or the partially circular ring shape coincides with the center of the end face 10Sa, for example. Herein, the partially circular ring shape is a shape obtained by partial lack of the circular ring shape.

A plurality of clicks 13 is provided for rotationally fixing the battery block 10B to the connecting spacer 20. A plurality of clicks 13 is sporadically provided on a virtual circle concentric with the convex portion 12 on an outer side of the convex portion 12. Although an example in which a plurality of clicks 13 is arranged on a peripheral edge of the end face 10Sa is illustrated in FIGS. 4A and 4B, arrangement positions of a plurality of clicks 13 are not limited to this example and the clicks may also be located on an inner side of the peripheral edge of the end face 10Sa. The click 13 has a shape bent toward an outer side of the end face 10Sa as illustrated in FIG. 4C. A cross-sectional shape of the click 13 is a substantially L shape, for example.

Figure 5:
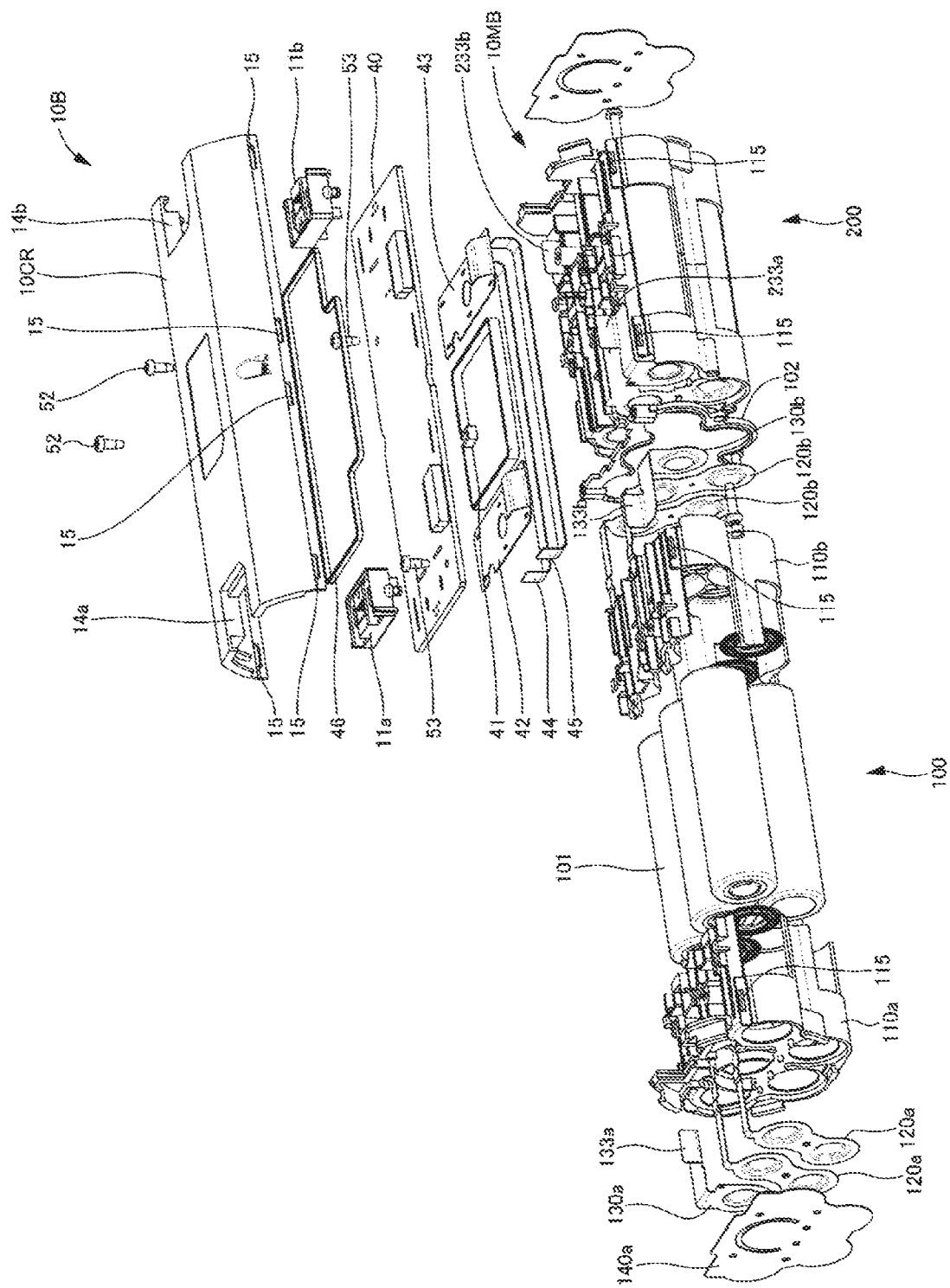
FIG. 5 is an exploded perspective view illustrating an example of a configuration of the battery block.
Figure 12:
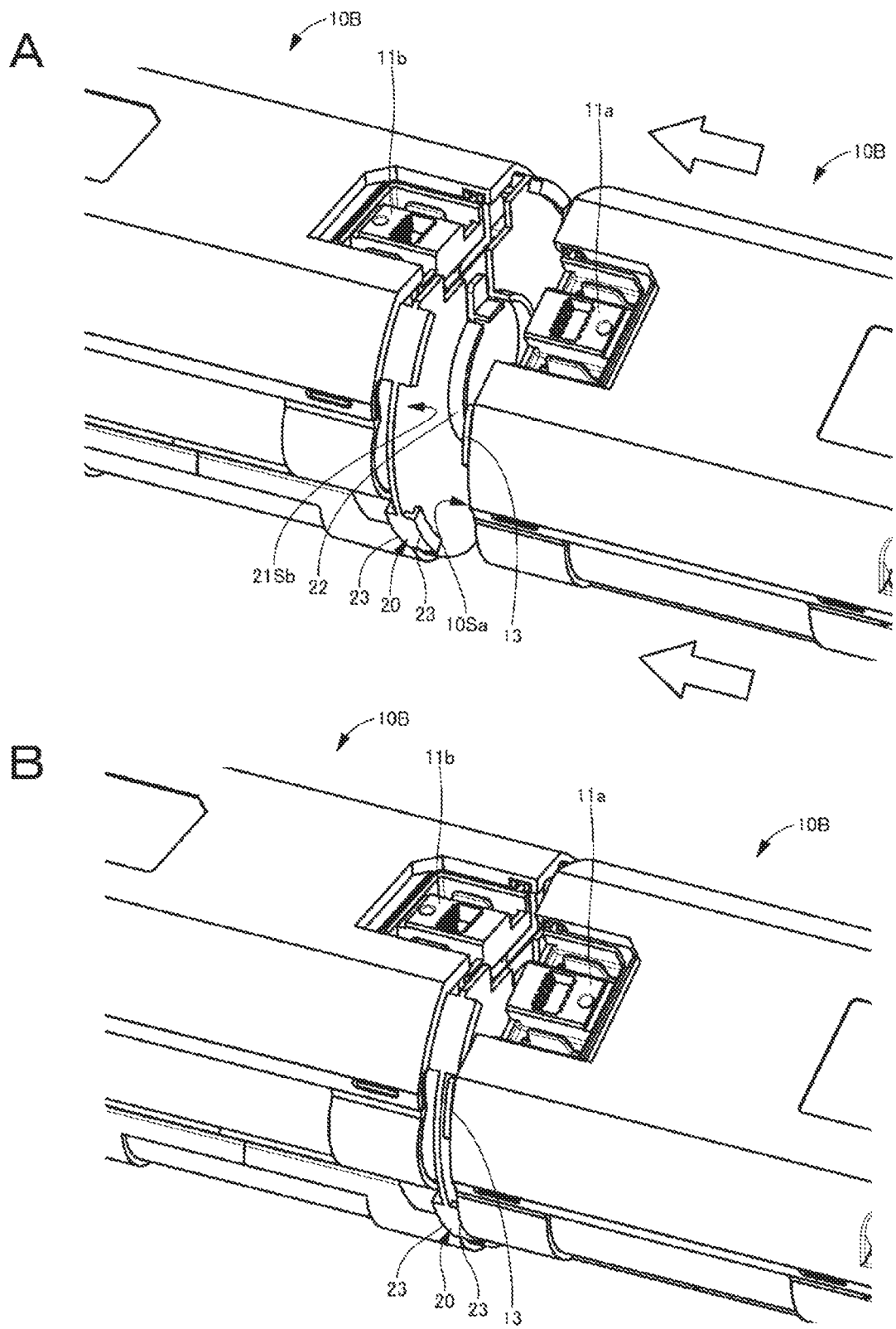
FIGS. 12A and 12B are perspective views for illustrating an example of a method of connecting the battery packs according to the first embodiment of the present technology.
Figure 13:
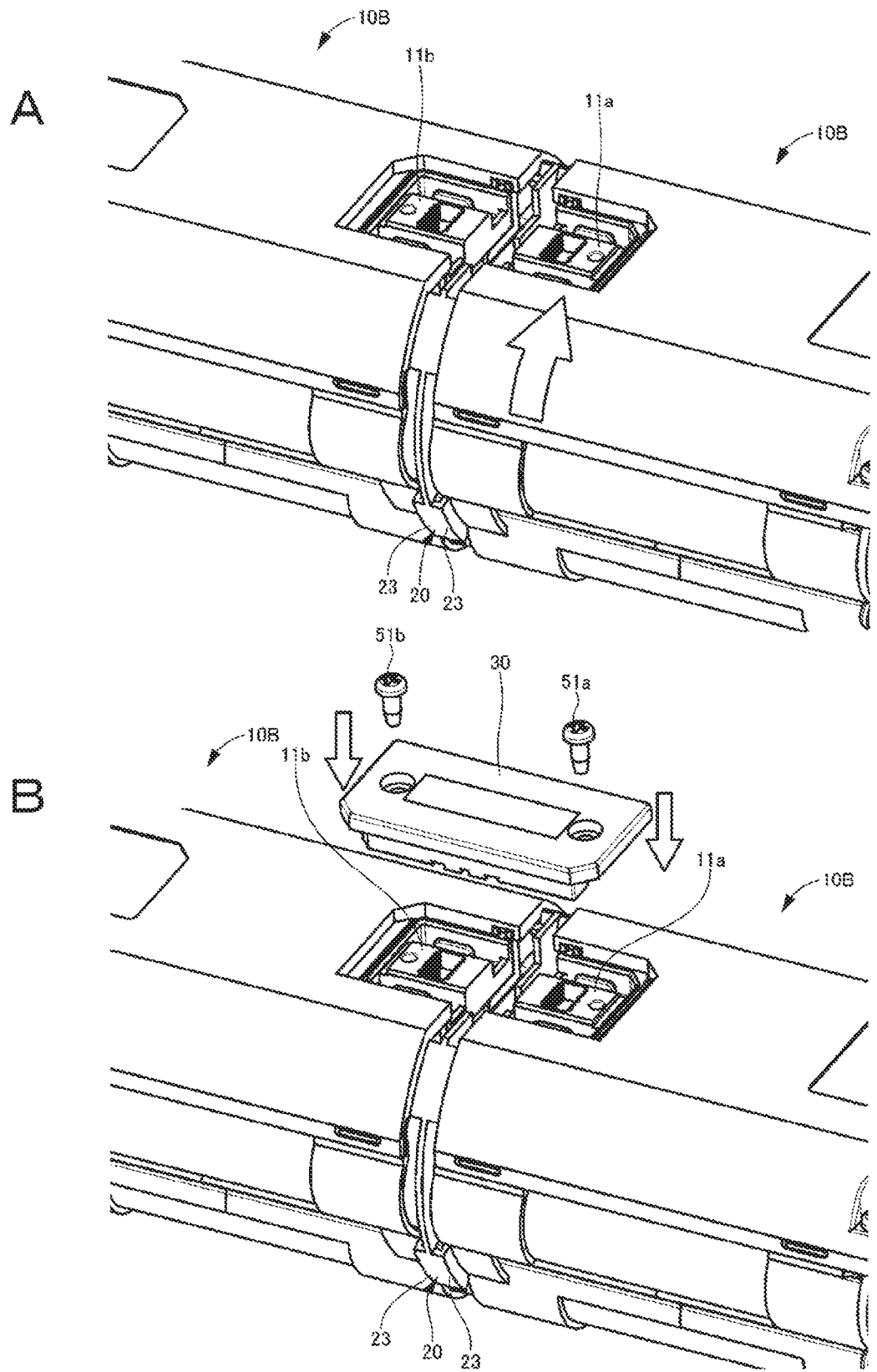
FIGS. 13A and 13B are perspective views for illustrating an example of the method of connecting the battery packs according to the first embodiment of the present technology.

As illustrated in FIGS. 3A, 3B, and 5, the battery block 10B is provided with a battery block main body 10MB, a printed-wiring substrate 40 arranged in a predetermined area between both end faces of the battery block main body 10MB, and a cover 10CR provided on the battery block main body 10MB so as to cover the printed-wiring substrate 40. The printed-wiring substrate 40 is fixed in a predetermined area of the battery block 10B by means of a plurality of screws 53. The cover 10CR is fixed to the battery block main body 10MB by means of a plurality of screws 52.

The battery block 10B is further provided with a tray 41, flexible substrates 42 and 43, and connecting bars 44 and 45 provided between a rear surface of the printed-wiring substrate 40 and the battery block main body 10MB. Also, the battery block 10B is further provided with a sealing member 46 provided between a front surface of the printed-wiring substrate 40 and a rear surface of the cover 10CR. Herein, a surface opposed to the battery block main body 10MB is referred to as the rear surface and a surface opposite thereto is referred to as the front surface.

[Battery Block Main Body]

The battery block main body 10MB is provided with sub blocks 100 and 200 and a spacer 102. Since the sub blocks 100 and 200 have substantially the same configurations, the configuration of the sub block 100 is hereinafter mainly described.

As illustrated in FIG. 5, the sub block 100 is provided with a plurality of batteries 101 and holders 110a and 110b. One end of a plurality of batteries 101 is fixed by the holder 110a and the other end of a plurality of batteries 101 is fixed by the holder 110b.

The battery 101 is the battery having a cylindrical shape including a positive electrode terminal unit and a negative electrode terminal unit on both ends thereof, for example. Meanwhile, the shape of the battery 101 is not limited to the cylindrical shape; the batteries having various shapes such as a rectangular shape may also be used. The battery 101 is a secondary battery which may be repeatedly used, for example. Such secondary battery includes a lithium ion secondary battery, a lithium ion polymer secondary battery and the like, for example.

A plurality of batteries 101 accommodated in the battery block 10B is connected to each other in series and/or in parallel. FIG. 5 illustrates an example in which ten batteries 101 are accommodated in the battery block 10B and the batteries 101 are connected in series.

As illustrated in FIG. 6A, the holder 110a includes a plurality of holes having cylindrical shapes and the like, and one end of a plurality of batteries 101 having cylindrical shapes and the like fits in the holes to fix the one end of a plurality of batteries 101. An opening 112a is provided on a bottom surface portion of each hole. A positive electrode terminal 101a and a negative electrode terminal 101b of the batteries 101 are electrically connected to projections 122a and 132a of a plurality of connecting plates 120a and 130a, respectively, through the openings 112a. A cover 140a is provided on a plurality of connecting plates 120a and 130a. A spacer 150a is arranged between the positive electrode terminal 101a of the battery 101 and the bottom surface portion of the hole of the holder 110a. The spacer 150a has an opening and a convex positive electrode terminal 101a is arranged on the opening. According to this, the positive electrode terminal 101a and the negative electrode terminal 101b of a plurality of batteries 101 are adjusted to have the same height.

The holder 110a includes an accommodating unit on a side opposite to a side on which the one end of a plurality of batteries 101 is fixed and a plurality of connecting plates 120a and 130a and the cover 140a are accommodated in the accommodating unit. The holder 110a includes a plurality of projections 111a and the convex portion 12 in the accommodating unit. The connecting plates 120a and 130a including through holes 121a and 131a, respectively, and the cover 140a includes a plurality of through holes 141a and a through hole 142a. The projections 111a fit in the through holes 121a and 131a in a state in which a plurality of connecting plates 120a and 130a and the cover 140a are accommodated in the accommodating unit of the holder 110a. Also, the convex portion 12 is projected from the cover 140a through the through hole 142a.

As illustrated in FIG. 6B, the holder 110b includes a plurality of holes having cylindrical shapes and the like, and the other end of a plurality of batteries 101 having the cylindrical shapes and the like fits in the holes to fix the other end of a plurality of batteries 101. An opening 112b is provided on a bottom surface portion of each hole. The positive electrode terminal 101a and the negative electrode terminal 101b of the batteries 101 are electrically connected to projections 122b and 132b of a plurality of connecting plates 120b and 130b, respectively, through the openings 112b. The spacer 102 is provided on a plurality of connecting plates 120b and 130b. A spacer 150b is arranged between the positive electrode terminal 101a of the battery 101 and the bottom surface portion of the hole of the holder 110b. The spacer 150b includes an opening and the convex positive electrode terminal 101a is arranged in the opening. According to this, the positive electrode terminal 101a and the negative electrode terminal 101b of a plurality of batteries 101 are adjusted to have the same height.

The holder 110b includes an accommodating unit on a side opposite to a side on which the other end of a plurality of batteries 101 is fixed and a plurality of connecting plates 120b and 130b is accommodated in the accommodating unit. The holder 110b includes a plurality of projections (not illustrated) in the accommodating unit. The connecting plate 120b includes a through hole 121b. The connecting plate 130b also includes a through hole (not illustrated). In a state in which the connecting plate 120b is accommodated in the accommodating unit of the holder 110b, the projection fits in the through hole 121a of the connecting plate 120b. Also, in a state in which the connecting plate 130b is accommodated in the accommodating unit of the holder 110b, the projection fits in the through hole of the connecting plate 130b.

There is an insulating material such as plastic, for example, as a material of the holders 110a and 110b. The material of the holders 110a and 110b may contain metal powder or carbon. According to this, thermal conductivity of the holders 110a and 110b is improved and generated heat of the battery 101 may be efficiently radiated to the outside. Also, the material of the holders 110a and 110b may contain glass fiber or carbon fiber. According to this, mechanical strength of the holders 110a and 110b may be improved and strength of an entire battery pack when this is dropped may be improved.

[Printed-Wiring Substrate]

As illustrated in FIG. 7A, the printed-wiring substrate 40 having a substantially rectangular shape is provided with the connector 11a on one end in a longitudinal direction thereof and the connector 11b on the other end in the longitudinal direction. Connectors 47 and 48 are provided on the front surface of the printed-wiring substrate 40. The flexible substrates 42 and 43 are electrically connected to the connectors 47 and 48, respectively. A positive electrode terminal 133a and a negative electrode terminal 133b of the sub block 100 are electrically connected to the printed-wiring substrate 40. Also, a positive electrode terminal 233a and a negative electrode terminal 233b of the sub block 200 are electrically connected to the printed-wiring substrate 40. A thermistor (not illustrated) as a temperature detecting element is provided on the rear surface side of the printed-wiring substrate 40.

[Tray]

As illustrated in FIG. 7B, a peripheral wall portion 41a is provided on a peripheral edge of a front surface of the tray 41. In a state in which the printed-wiring substrate 40 is fixed on the front surface of the tray 41, a tip end of the peripheral wall portion 41a is pressed against the rear surface of the printed-wiring substrate 40. According to this, a predetermined area on the rear surface of the printed-wiring substrate 40 is sealed by the front surface and the peripheral wall portion 41a of the tray 41. Therefore, a predetermined area on the front surface of the printed-wiring substrate 40 may be made waterproof. The sealing member 46 preferably has flexibility and contains silicon resin, for example.

[Sealing Member]

As illustrated in FIG. 8A, a wall portion 16 is provided on the rear surface of the cover 10CR. The wall portion 16 is provided so as to enclose a predetermined area on the front surface of the printed-wiring substrate 40 in a state in which the cover 10CR is fixed to the battery block main body 10MB. A principal component of the printed-wiring substrate 40 is provided in a predetermined area. The principal component is a component which should be made waterproof, for example. Specifically, for example, there are a charge/discharge controller including a semiconductor switch such as a field effect transistor (FET), a voltage measuring unit, a current measuring unit, the temperature detecting element, a temperature measuring unit and the like. The sealing member 46 having a shape similar to that of the wall portion 16 provided on the rear surface of the cover 10CR is provided on a tip end of the wall portion 16.

As illustrated in FIG. 8B, the sealing member 46 includes a groove 46a in a portion opposed to the tip end of the wall portion 16 and the tip end of the wall portion 16 fits in the groove 46a. A cross-sectional shape of the groove 46a includes a substantially U shape, a substantially V shape and the like, for example, but the shape is not limited thereto.

The sealing member 46 preferably has flexibility. From the viewpoint of the flexibility, the sealing member 46 preferably includes a rubber material such as nitrile rubber, styrol rubber, silicon rubber, fluorine rubber, styrene-butadiene rubber, butadiene rubber, isoprene rubber, acrylic rubber, and acrylonitrile-butadiene rubber.

The wall portion 16 is pressed against the front surface of the printed-wiring substrate 40 through the sealing member 46 in a state in which the cover 10CR is fixed to the battery block main body 10MB. According to this, a predetermined area on the front surface of the printed-wiring substrate 40 is sealed by the rear surface of the cover 10CR and the wall portion 16. Therefore, a predetermined area on the front surface of the printed-wiring substrate 40 may be made waterproof.

[Cover]

As illustrated in FIGS. 3A and 5, the cover 10CR has a columnar surface shape, and a cutout 14a is provided on one end on an end face 10Sa side out of both ends in an extending direction of the columnar surface and a cutout 14b is provided on the other end on the end face 10Sb side. The columnar surface includes a substantially arc-shaped or substantially trapezoidal-shaped cross-sectional surface, for example. The connectors 11a and 11b expose from the cutouts 14a and 14b, respectively.

The cutouts 14a and 14b are arranged so as to be opposed to each other in a state in which a plurality of battery blocks 10B is connected to each other by the connecting spacer 20. An opening is formed in the connecting portion of the two battery blocks 10B by the cutouts 14a and 14b arranged so as to be opposed to each other. The relay connector 30 fits in the connectors 11a and 11b through the opening. A plurality of holes 15 is provided around the cover 10CR. A plurality of projections 115 provided on the sub blocks 100 and 200 fits in a plurality of holes 15, respectively.

(Connecting Spacer)

As illustrated in FIG. 9A, the connecting spacer 20 is provided with a base body 21 including principal surfaces 21Sa and 21Sb, a convex portion 22 and a plurality of clicks (second clicks) 23 provided on the principal surface 21Sa, and a plurality of clicks (second clicks) 23 and the convex portion 22 provided on the principal surface 21Sb.

The base body 21 has a shape obtained by cutting out a part of a disk shape. The relay connector 30 is provided so as to stride across the connecting portion of the battery blocks 10B through a cutout 24.

As illustrated in FIG. 9A, the principal surface 21Sa has a shape obtained by cutting out a part of a circle. A plurality of clicks 23 is provided on an arc-shaped portion out of a peripheral edge of the principal surface 21Sa and the convex portion 22 is provided on the center of the principal surface 21Sa. Meanwhile, an example in which five clicks 13 are provided is illustrated in FIGS. 9A and 9B.

The convex portion 22 is a positioning unit for positioning the battery block 10B with respect to the principal surface 21Sa of the connecting spacer 20. Center axes of the connecting spacer 20 and the battery block 10B coincide with each other by this positioning. The convex portion 22 has a circular ring shape or a partially circular ring shape, for example. The center of the circular ring shape or the partially circular ring shape coincides with the center of the principal surface 21Sa, for example. A diameter of the convex portion 22 is set to be slightly smaller or larger than a diameter of the convex portion 12 of the battery block 10B. According to this, the convex portion 22 of the connecting spacer 20 may fit in the convex portion 12 of the battery block 10B.

A plurality of clicks 23 is provided for rotationally fixing the battery block 10B to the connecting spacer 20. The rotational fixing of the battery block 10B to the connecting spacer 20 is rotational fitting of a plurality of clicks 13 of the battery block 10B and a plurality of clicks 23 of the connecting spacer 20. A plurality of clicks 23 is sporadically provided on a virtual circle concentric with the convex portion 12 on an outer side of the convex portion 22. Although an example in which a plurality of clicks 23 is arranged on the peripheral edge of the principal surface 21Sa is herein described, positions of a plurality of clicks 23 are not limited to this example and the clicks may also be located in positions on an inner side of the peripheral edge of the principal surface 21Sa. The click 23 has a shape bent toward an inner side of the principal surface 21Sa as illustrated in FIG. 9C. A cross-sectional shape of the click 23 is a substantially L shape, for example. In a state in which the battery block 10B is fixed to the principal surface 21Sa of the connecting spacer 20, each click 13 of the battery block 10B fits in an inner side of each click 23.

At least one of a plurality of clicks 23 included in the principal surface 21Sa includes a wall portion 23a on one end in a peripheral direction of an outer periphery of the principal surface 21Sa. That is to say, one end in the peripheral direction of the outer periphery of the principal surface 21Sa has a configuration closed by the wall portion 23a. For example, it is possible that all of a plurality of clicks 23 included in the principal surface 21Sa include the wall portion 23a or only a specific click 23 out of a plurality of clicks 23 included in the principal surface 21Sa includes the wall portion 23a. When the battery block 10B is rotationally fixed to the principal surface 21Sa of the connecting spacer 20, rotation is stopped by the wall portion 23a.

The principal surface 21Sb has a configuration similar to that of the principal surface 21Sa, so that the configuration of the principal surface 21Sb is not described.

(Connector)

The connector 11a is provided on the end on the end face 10Sa side of the peripheral surface of the battery block 10B. On the other hand, the connector 11b is provided on the end on the end face 10Sb side of the peripheral surface of the battery block 10B. The connectors 11a and 11b are provided in overlapping positions as seen in a direction perpendicular to the end face 10Sa or 10Sb of the battery block 10B.

As illustrated in FIG. 10A, the connector 11a is provided with sockets 411, 421, and 431 as connecting terminals. The socket 431 is provided between the sockets 411 and 421. Also, a through hole 441 for the screw 51a to pass is provided on the connector 11a. The connector 11b has a configuration similar to that of the connector 11a, so that the configuration of the connector 11b is not described.

The sockets 411 and 421 are electrode terminals for electrically connecting the two battery blocks 10B to each other in series or in parallel. For example, the socket 411 is a positive electrode terminal and the socket 421 is a negative electrode terminal. The socket 431 is a signal terminal for communicating a control signal for controlling a charge/discharge control circuit provided on the printed-wiring substrate 40 and an information signal related to a measured value of voltage, current, and temperature with an electric device main body.

The socket 411 includes a terminal 413 projecting from a bottom surface thereof. Also, the socket 421 includes a terminal 423 projecting from a bottom surface thereof. The terminals 413 and 423 have plate shapes, for example.

The socket 431 includes wall surfaces 432Sa and 432Sb opposed to each other. A plurality of grooves 433 extending in a depth direction of the socket 431 is provided on each of the wall surfaces 432Sa and 432Sb. A connecting terminal 434 is provided on each groove 433.

(Relay Connector)

The relay connector 30 electrically connects the two connected battery blocks 10B to each other in series or in parallel. The relay connector 30 fixes the two battery blocks connected to each other by the connecting spacer 20. For example, this prevents position misalignment due to rotation between the two connected battery blocks 10B.

A fitting direction of the relay connector 30 to the connectors 11a and 11b is a direction perpendicular or substantially perpendicular to a connecting direction of a plurality of battery blocks 10B, that is to say, a rotational axis direction. Due to such fitting direction, the relay connector 30 is less likely to be dropped from the connectors 11a and 11b even when the battery pack is shocked. Therefore, resistance to shock of the battery pack is improved.

As illustrated in FIG. 10B, the relay connector 30 includes a base body 31 and relay connector elements 32a and 32b provided on the base body 31. The relay connector elements 32a and 32b fit in the connectors 11a and 11b opposed to each other in the connecting portion between the two battery blocks 10B. The relay connector element 32a has a configuration similar to that of the relay connector 32b, so that the configuration of the relay connector 32b is not hereinafter described.

The relay connector element 32a is provided with plugs 311, 321, and 331 as connecting terminals. The plug 331 is provided between the plugs 311 and 321. Also, a through hole 341 for the screw 51a to pass is provided on the relay connector element 32a. The plugs 311 and 321 are electrode terminals for electrically connecting the two battery blocks 10B to each other in series or in parallel. For example, the plug 311 is a positive electrode terminal and the plug 321 is a negative electrode terminal. The plug 331 is a signal terminal for communicating the control signal, the information signal and the like with the electric device main body.

The plug 311 is provided with a hole 312 and a terminal 313 provided in the hole 312. Also, the plug 321 is provided with a hole 322 and a terminal 323 provided in the hole 322. The terminal 313 is a plate spring-shaped terminal which grips the terminal 413 of the socket 411 therebetween, for example. The terminal 323 is a plate spring-shaped terminal which grips the terminal 423 of the socket 421 therebetween, for example.

The plug 331 includes a pair of wall surfaces 332Sa and 332Sb. A plurality of grooves 333 extending in a height direction of the plug 331 is provided on each of the wall surfaces 332Sa and 332Sb. A connecting terminal 334 is provided so as to project from the groove 333 on each groove 333.

A groove 31G is provided on the center of the base body 31. The groove 31G fits in the cutout 24 of the connecting spacer 20 in a state in which the relay connector 30 fits in the connectors 11a and 11b arranged so as to be opposed to each other in the connecting portion.

As illustrated in FIG. 11A, the plugs 311 and 321 fit in the sockets 411 and 421, respectively, in the state in which the relay connector 30 fits in the connectors 11a and 11b arranged so as to be opposed to each other in the connecting portion. In this state, the terminal 313 of the plug 311 grips the terminal 413 of the socket 411 and the terminal 323 of the plug 321 grips the terminal 423 of the socket 421.

As illustrated in FIG. 11B, the plug 331 fits in the socket 431 in the state in which the relay connector 30 fits in the connectors 11a and 11b arranged so as to be opposed to each other in the connecting portion. In this state, a plurality of terminals 334 on the wall surface 332Sa is brought into contact with the terminals 434 on the wall surface 432Sa of the socket 431 to be electrically connected thereto. Also, a plurality of terminals 334 on the wall surface 332Sb is brought into contact with the terminals 434 on the wall surface 432Sb of the socket 431 to be electrically connected thereto. Therefore, the plug 331 and the socket 431 may maintain electrical contact in both the wall surfaces 332Sa and 432Sa and the wall surfaces 332Sb and 432Sb.

A plurality of terminals 334 on the wall surface 332Sa is electrically connected to a plurality of terminals 334 on the wall surface 332Sb, respectively. Also, a plurality of terminals 434 on the wall surface 432Sa is electrically connected to a plurality of terminals 434 on the wall surface 432Sb, respectively. Therefore, if there is electrical connection in at least one of the wall surfaces 332Sa and 432Sa and the wall surfaces 332Sb and 432Sb, charging or discharging operation of the battery pack may be normally performed. Therefore, excellent quake resistance may be obtained.

[1.2 Method of Connecting Battery Packs]

Hereinafter, an example of a method of connecting the battery packs according to the first embodiment of the present technology is described with reference to FIGS. 12A to 13B. Herein, a case in which the connecting spacer 20 is rotationally fixed to the end face 10Sb of one battery block 10B out of the two connected battery blocks 10B in advance is described as an example.

First, as illustrated in FIG. 12A, the end face 10Sa of the battery block 10B is allowed to approach the principal surface 21Sb of the connecting spacer 20 while the principal surface 21Sb of the connecting spacer 20 is maintained to be parallel to the end face 10Sa of the battery block 10B to be connected thereto. At that time, approaching operation described above is performed while a state in which the battery block 10B to be connected is rotated by a predetermined angle (for example, approximately 25 degrees in a counterclockwise direction) from a final rotational position is maintained.

Next, the click 13 of the end face 10Sa of the battery block 10B is pressed against a space in which the click 23 is not provided out of the peripheral edge of the principal surface 21Sb of the connecting spacer 20 as illustrated in FIG. 12B while the convex portion 12 of the end face 10Sa of the battery block 10B fits in the convex portion 22 of the principal surface 21Sb of the connecting spacer 20.

Next, as illustrated in FIG. 13A, the battery block 10B is relatively rotated with respect to the connecting spacer 20 while a state in which the click 13 of the end face 10Sa of the battery block 10B is pressed against the peripheral edge of the principal surface 21Sb of the connecting spacer 20 is maintained. According to this, the click 13 of the end face 10Sa of the battery block 10B fits in the click 23 of the principal surface 21Sb of the connecting spacer 20. Also, the connectors 11a and 11b are arranged so as to be opposed to each other between the battery blocks 10B.

Next, as illustrated in FIG. 13B, the relay connector 30 fits in the connectors 11a and 11b opposed to each other between the battery blocks 10B. Meanwhile, the fitting direction of the relay connector 30 is the direction perpendicular or substantially perpendicular to the connecting direction of the battery blocks 10B and 10B. Next, one end of the relay connector 30 is fixed to the connector 11a by means of the screw 51a and the other end of the relay connector 30 is fixed to the connector 11b by means of the screw 51b. From above, the battery pack in which the two battery blocks 10B are connected to each other may be obtained.

[1.3 Effect]

In the battery pack according to the first embodiment, the battery block 10B includes the end faces 10Sa and 10Sb on which a plurality of clicks 13 is provided on a virtual circumference. Also, the connecting spacer 20 includes the principal surfaces 21Sa and 21Sb on which a plurality of clicks 23 is provided on a virtual circumference. When the battery block 10B is rotationally fixed to the principal surface 21Sa or 21Sb of the connecting spacer 20, each click 23 of the principal surfaces 21Sa and 21Sb is rotationally fit in the inner side of each click 13 of the end face 10Sa or 10Sb. Therefore, a plurality of battery blocks 10B may be easily connected to each other.

In a state in which the battery blocks 10B and 10B are rotationally fixed to the principal surfaces 21Sa and 21Sb of the connecting spacer 20, respectively, the connectors 11a and 11b are arranged so as to be opposed to each other in the connecting portion of the battery blocks 10B and 10B. Therefore, it is possible to electrically connect the battery blocks 10B and 10B to each other only by fitting one relay connector 30 in the connectors 11a and 11b.

2 Second Embodiment

In a second embodiment, an electric device provided with a battery pack according to the first embodiment is described.

Figure 14:
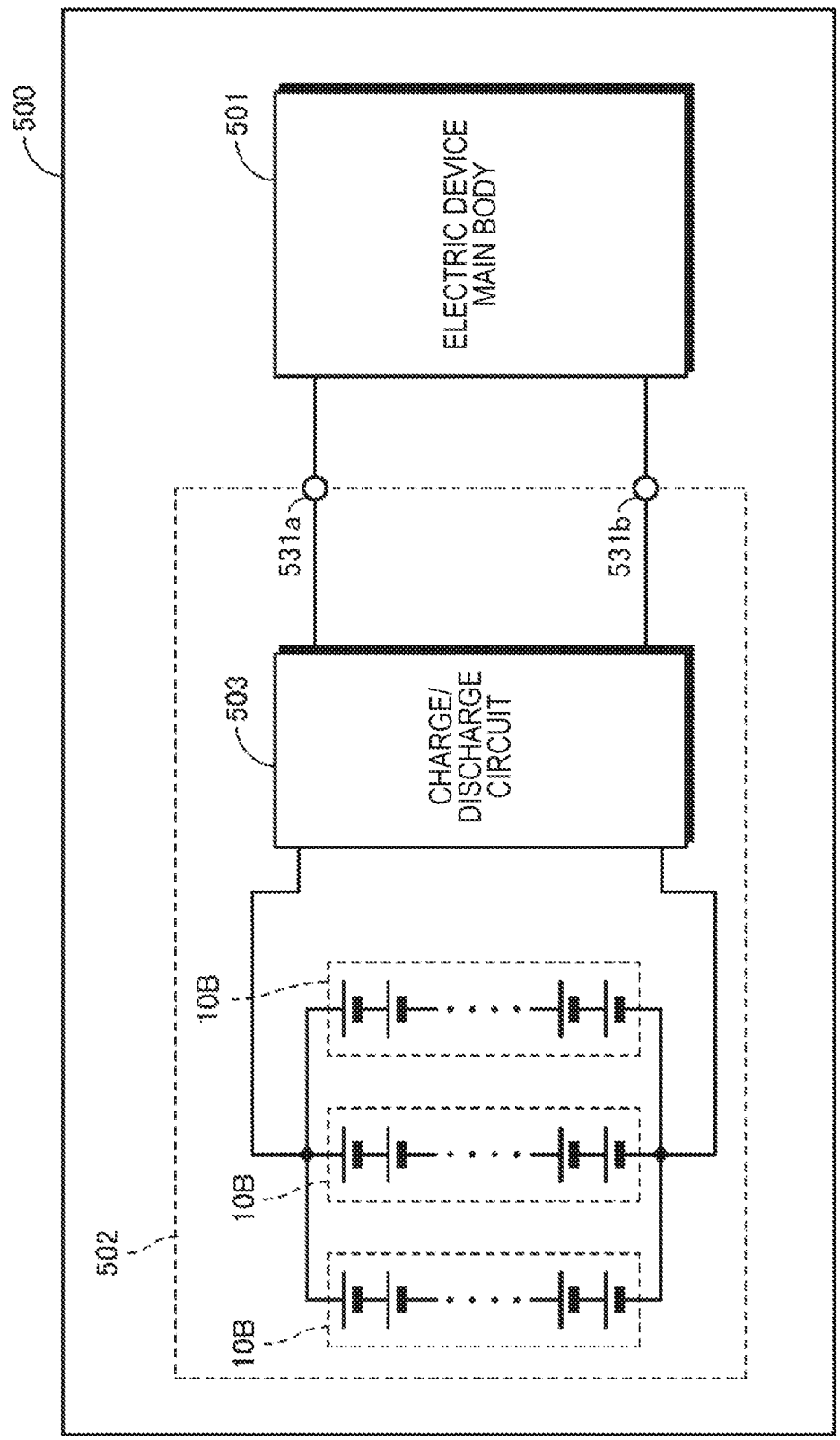
FIG. 14 is a block diagram illustrating an example of a configuration of an electric device according to a second embodiment of the present technology.

Hereinafter, one configuration example of an electric device 500 according to the second embodiment of the present technology is described with reference to FIG. 14. The electric device 500 is provided with an electric device main body 501 and a battery pack 502. The battery pack 502 is provided with a plurality of battery blocks 10B connected to each other in series and/or in parallel and a charge/discharge circuit 503. Meanwhile, a configuration in which the charge/discharge circuit is provided on each battery block 10B may also be adopted. A plurality of battery blocks 10B connected to each other in series and/or in parallel is electrically connected to the charge/discharge circuit 503. The charge/discharge circuit 503 is electrically connected to the electric device main body 501 through a positive electrode terminal 531a and a negative electrode terminal 531b. The electric device 500 has, for example, a configuration to/from which the battery pack 502 may be attached/detached by a user. Meanwhile, the configuration of the electric device 500 is not limited thereto; this may also have the configuration in which the battery pack 502 is embedded in the electric device 500 such that the user cannot detach the battery pack 502 from the electric device 500.

The electric device 500 includes, for example, a power tool such as an electric motorcycle, an electric bicycle, a power-assisted bicycle, a hybrid vehicle, and an electric tool. The electric device 500 is not limited thereto and the electric device 500 other than the above-described ones includes a notebook personal computer, a tablet computer, a mobile phone (for example, a smartphone), a personal digital assistant (PDA), an imaging device (for example, a digital still camera and a digital video camera), an audio device, a game device, a navigation system, an electric shaver, a refrigerator, an air conditioner, a television, a stereo, a water heater, a microwave oven, a dishwasher, a washing machine, a dryer, a lighting device, a toy, a medical device, a robot, a road conditioner, a traffic signal and the like, for example.

(Electric Device Main Body)

The electric device main body 501 is supplied with electric power from the battery pack 502 through the positive electrode terminal 531a and the negative electrode terminal 531b. The electric device main body 501 may also be provided with a power generating unit which generates electric power from given power such as rotation and supplies the electric power to the battery pack 502 through the positive and negative electrode terminals 531a and 531b.

(Battery Pack)

The battery pack 502 is the battery pack according to the first embodiment. While charging, the charge/discharge circuit 503 controls charge to the battery block 10B. On the other hand, while discharging (that is to say, when the electric device 500 is used), the charge/discharge circuit 503 controls discharge to the electric device main body 501.

Although the embodiments of the present technology are heretofore described specifically, the present technology is not limited to the above-described embodiments, and various modifications based on the technical idea of the present technology may be made.

For example, the configuration, the method, the process, the shape, the material, the numerical value and the like described in the above-described embodiments are merely examples, and the configuration, the method, the process, the shape, the material, the numerical value and the like different from those described above may also be used as necessary.

Also, the configuration, the method, the process, the shape, the material, the numerical value and the like of the above-described embodiments may be combined with each other within the gist of the present technology.

Although a configuration in which a plurality of clicks of the battery block has a shape bent toward an outer side (hereinafter, referred to as an "outer click shape") and a plurality of clicks of a connecting spacer has a shape bent toward an inner side (hereinafter, referred to as an "inner click shape") is described as an example in the above-described embodiments, the present technology is not limited to this example. A plurality of clicks of the battery block may have the inner click shape and a plurality of clicks of the connecting spacer may have the outer click shape. It is also possible that each of the battery block and the connecting spacer includes both one or a plurality of clicks having the inner click shape and one or a plurality of clicks having the outer click shape.

Although an example in which the present technology is applied to connection between the battery blocks is described in the above-described embodiments, the present technology may also be applied to connection between the electric device and the battery pack or the battery block. In this case, the electric device may be provided with a plurality of clicks and a positioning unit for rotationally fixing the connecting spacer.

Although a configuration in which each of all the battery blocks forming the battery pack includes a peripheral surface on both ends of which connectors (first connectors) are provided is described as an example in the above-described embodiments, the battery block located on both ends or one end of the battery pack may also have a configuration including the peripheral surface on only one end of which the connector (first connector) is provided.

Although a configuration in which the connecting spacer is provided between end faces of the adjacent battery blocks and the adjacent battery blocks are connected to each other through the connecting spacer is described in the above-described embodiments, the present technology is not limited to this example. For example, it is also possible to adopt a configuration in which the connecting spacer is integrally provided on the end face of one battery block out of the adjacent battery blocks and the adjacent battery blocks are connected to each other through the integrally provided connecting spacer. By adopting such configuration, it is possible to connect the battery blocks to each other by rotational fixing without separately providing the connecting spacer between the battery blocks, so that the configuration of the battery pack may further be simplified.

Herein, the battery pack having the above-described configuration is described in further detail with reference to FIG. 15. Meanwhile, the portion the same as or corresponding to that of the first embodiment is assigned with the same reference signal. A convex portion 22 and a plurality of clicks 23 are provided on one end face 10Sa of the battery block 10B. On the other hand, a convex portion 12 and a plurality of clicks 13 (refer to FIGS. 3A, 3B, and 4A to 4C) are provided on the other end face 10Sb as is the case with the battery block 10B in the first embodiment.

Meanwhile, although an example in which a plurality of clicks 23 is arranged on a peripheral edge of the end face 10Sa is illustrated in FIG. 15, arrangement positions of a plurality of clicks 23 are not limited to this example and the clicks may also be located on an inner side of the peripheral edge of the end face 10Sa. It is also possible that one of the connected two battery blocks 10B is provided with the convex portion 22 and a plurality of clicks 23 on both the end faces 10Sa and 10Sb and the other is provided with the convex portion 12 and a plurality of clicks 13 on both the end faces 10Sa and 10Sb. It is also possible that the electric device 500 according to the second embodiment is provided with the battery pack according to a variation illustrated in FIG. 15 in place of the battery pack according to the first embodiment.

Although a configuration in which the battery pack and the battery block have substantially cylindrical shapes is described as an example in the above-described embodiments, the shapes of the battery pack and the battery block are not limited to this example and they may also be a substantially rectangular shape or a substantially polygonal shape.

The present technology may also adopt the following configurations.

(1)

A battery pack including:

a plurality of battery blocks each including a peripheral surface on one end or both ends of which a first connector is provided;

a connecting unit which connects the plurality of battery blocks to each other such that two first connectors are opposed to each other; and a second connector which fits in the two first connectors opposed to each other, wherein a battery block is rotationally fixed to the connecting unit.

(2)

The battery pack according to (1), wherein the battery block includes a first click, the connecting unit includes a second click, and rotational fixing is rotational fitting of the first click and the second click.

(3)

The battery pack according to (1) or (2), wherein a fitting direction of the second connector is a direction perpendicular or substantially perpendicular to a connecting direction of the plurality of battery blocks.

(4)

The battery pack according to any one of (1) to (3), wherein the second connector fixes two battery blocks connected to each other by the connecting unit.

(5)

The battery pack according to any one of (1) to (4), wherein the second connector is provided with a base body and two connector elements provided on the base body, and the two connector elements fit in the two first connectors opposed to each other, respectively.

(6)

The battery pack according to any one of (1) to (5), wherein the battery block and the connecting unit are further provided with a positioning unit for positioning the battery block with respect to the connecting unit.

(7)

The battery pack according to (6), wherein the positioning unit is a ring-shaped or partially ring-shaped projection, and the projection of the battery block and the projection of the connecting unit fit in each other.

(8)

The battery pack according to any one of (1) to (7), wherein the battery block is provided with a battery block main body, a wiring substrate provided on the battery block main body, and a cover provided on the battery block main body so as to cover the wiring substrate, and the cover is provided with a wall portion pressed against the wiring substrate to enclose a predetermined area of the wiring substrate and a sealing member provided on a tip end of the wall portion.

(9)

The battery pack according to any one of (1) to (7), wherein the battery block is provided with a battery block main body, a tray provided on the battery block main body, and a wiring substrate provided on the tray, and the tray is provided with a peripheral wall portion pressed against the wiring substrate.

(10)

An electric device including:

a battery pack; and an electric device main body supplied with electric power from the battery pack, wherein the battery pack is provided with a plurality of battery blocks each including a peripheral surface on one end or both ends of which a first connector is provided, a connecting unit which connects the plurality of battery blocks to each other such that two first connectors are opposed to each other, and a second connector which fits in the two first connectors opposed to each other, and a battery block is rotationally fixed to the connecting unit.

(11)

The electric device according to (10), wherein the electric device main body is provided with a power generating unit which generates electric power from given power and supplies the electric power to the battery pack.

(12)

A battery pack including:

a plurality of battery blocks each including a peripheral surface on one end or both ends of which a first connector is provided; and a second connector which fits in two first connectors opposed to each other between ends of the battery blocks, wherein the ends of the battery blocks are rotationally fixed to each other.

(13)

The battery pack according to (12), wherein the battery block includes a first click provided on one end and a second click provided on the other end, and the rotational fixing is rotational fitting of the first click and the second click.

(14)

The battery pack according to (12) or (13), wherein a fitting direction of the second connector is a direction perpendicular or substantially perpendicular to a connecting direction of the plurality of battery blocks.

(15)

The battery pack according to any one of (12) to (14), wherein the second connector fixes two battery blocks connected to each other.

(16)

The battery pack according to any one of (12) to (15), wherein the second connector is provided with a base body and two connector elements provided on the base body, and the two connector elements fit in the two first connectors opposed to each other, respectively.

(17)

The battery pack according to any one of (12) to (16), wherein the battery block is further provided with a positioning unit for positioning between the battery blocks.

(18)

The battery pack according to (17), wherein the positioning unit is a ring-shaped or partially ring-shaped projection, and projections of the battery blocks fit in each other.

(19)

The battery pack according to any one of (12) to (18), wherein the battery block is provided with a battery block main body, a wiring substrate provided on the battery block main body, and a cover provided on the battery block main body so as to cover the wiring substrate, and the cover is provided with a wall portion pressed against the wiring substrate to enclose a predetermined area of the wiring substrate and a sealing member provided on a tip end of the wall portion.

(20)

The battery pack according to any one of (12) to (18), wherein the battery block is provided with a battery block main body, a tray provided on the battery block main body, and a wiring substrate provided on the tray, and the tray is provided with a peripheral wall portion pressed against the wiring substrate.

(21)

The battery pack according to any one of (12) to (20), further including:

a connecting member provided between the ends of the battery blocks, wherein the ends of the battery blocks are rotationally fixed to each other through the connecting member.

(22)

An electric device including:

a battery pack; and an electric device main body supplied with electric power from the battery pack, wherein the battery pack is provided with a plurality of battery blocks each including a peripheral surface on one end or both ends of which a first connector is provided, and a second connector which fits in two first connectors opposed to each other between ends of the battery blocks, and the ends of the battery blocks are rotationally fixed to each other.

(23)

The electric device according to (22), wherein the electric device main body is provided with a power generating unit which generates electric power from given power and supplies the electric power to the battery pack.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

| REFERENCE SIGNS LIST | |
|---|---|
| 10B | Battery block |
| 10Sa, 10Sb | End face |
| 10CR | Cover |
| 10MB | Battery block main body |
| 11a, 11b | Connector |
| 12, 22 | Click |

REFERENCE SIGNS LIST

| | |
|---|---|
| 13, 23 | Convex portion |
| 16 | Wall portion |
| 20 | Connecting spacer |
| 21Sa, 21Sb | Principal surface |
| 30 | Relay connector |
| 32a, 32b | Connector element |
| 40 | Printed-wiring substrate |
| 41 | Tray |
| 41a | Peripheral wall portion |
| 46 | Sealing member |
| 500 | Electric device |
| 501 | Electric device main body |
| 502 | Battery pack |

The invention claimed is:

1. A battery pack comprising:
a plurality of battery blocks each including a plurality of batteries fixed by a holder and a peripheral surface on one end or both ends of which a first connector is provided;
a connecting unit which connects the plurality of battery blocks to each other such that two first connectors are opposed to each other; wherein the connecting unit is provided between end faces of connected battery blocks, and
a second connector which fits in the two first connectors opposed to each other,
wherein at least one battery block of the plurality of battery blocks is rotated around a connection direction of the plurality of battery blocks and fixed to the connecting unit,
wherein the at least one battery block of the plurality of battery blocks includes a plurality of first clicks provided on a circumference of the end faces, the connecting unit includes a plurality of second clicks provided on a circumference, and the plurality of first clicks and the plurality of second clicks are rotational so that each of the plurality of second clicks rotationally fit in an inner side of each of the plurality of first clicks,
wherein the first connectors includes a first socket, a second socket and a third socket,
and an electrode terminal is provided in each of the first and second sockets,
wherein a signal terminal is provided in the third socket between the first and second sockets,
wherein a fitting direction of the second connector is a direction perpendicular or substantially perpendicular to the connecting direction of the plurality of battery blocks, and
wherein the second connector is configured to fix two battery blocks and electrically connect the two battery blocks to each other, and
wherein the second connector is provided with a base body and two connector elements provided on the base body, and the two connector elements fit in the two first connectors opposed to each other, respectively,
wherein one of the two connector elements includes a positive electrode terminal plug and a negative electrode terminal plug for electrically connecting two battery blocks to each other in series or in parallel and the signal terminal provided between the positive electrode terminal plug and the negative electrode terminal plug,
wherein the positive electrode terminal plug includes a plate spring-shaped terminal which grips the electrode terminal provided in the first socket,
wherein the negative electrode terminal plug includes a plate spring-shaped terminal which grips the electrode terminal provided in the second socket and
wherein the signal terminal fits in the third socket such that the signal terminal includes a plurality of terminals which are brought into contact with terminals of the third socket,
wherein the at least one battery block of the plurality of battery blocks and the connecting unit are further provided with a positioning unit for positioning the at least one battery block battery block with respect to the connecting unit, and
wherein the positioning unit is a ring-shaped or partially ring-shaped projection provided at the center of the at least one battery block battery block end face and the center of the connecting unit, and wherein the diameter of the projection of the connecting unit has a slightly smaller or larger diameter than a diameter of the projection of the at least one battery block battery block such that the projection of the at least one battery block battery block and the projection of the connecting unit fit in each other.

2. The battery pack according to claim 1, wherein the at least one battery block of the plurality of battery blocks is provided with a battery block main body, a wiring substrate provided on the battery block main body, and a cover provided on the battery block main body so as to cover the wiring substrate, and the cover is provided with a wall portion pressed against the wiring substrate to enclose a predetermined area of the wiring substrate and a sealing member provided on a tip end of the wall portion.

3. The battery pack according to claim 1, wherein the at least one battery block of the plurality of battery blocks is provided with a battery block main body, a tray provided on the battery block main body, and a wiring substrate provided on the tray, and the tray is provided with a peripheral wall portion pressed against the wiring substrate.

4. An electric device comprising: the battery pack according to claim 1.

5. The electric device according to claim 4, wherein the electric device is provided with a power generating unit which generates electric power from given power and supplies the electric power to the battery pack.

* * * * *